United States Patent
Norton et al.

(10) Patent No.: US 8,220,051 B2
(45) Date of Patent: Jul. 10, 2012

(54) GENERATION AND DELIVERY OF MULTIMEDIA CONTENT-ADAPTATION NOTIFICATIONS

(75) Inventors: Richard Elliott Norton, Ste-Genevieve (CA); Joseph Leo Claude Mario Lavalliere, Mascouche (CA)

(73) Assignee: Vantrix Corporation, Montreal (CA)

( * ) Notice: Subject to any disclaimer, the term of this patent is extended or adjusted under 35 U.S.C. 154(b) by 787 days.

(21) Appl. No.: 12/238,390

(22) Filed: Sep. 25, 2008

(65) Prior Publication Data

US 2009/0088191 A1   Apr. 2, 2009

Related U.S. Application Data

(60) Provisional application No. 60/976,145, filed on Sep. 28, 2007.

(51) Int. Cl.
*H04L 29/06* (2006.01)
(52) U.S. Cl. .............. 726/22; 726/23; 713/189
(58) Field of Classification Search ............ 726/22; 455/432.2
See application file for complete search history.

(56) References Cited

U.S. PATENT DOCUMENTS

| | | | |
|---|---|---|---|
| 6,785,732 B1 * | 8/2004 | Bates et al. ............ 709/232 |
| 6,888,477 B2 | 5/2005 | Lai et al. | |
| 6,970,602 B1 | 11/2005 | Smith | |
| 7,010,581 B2 | 3/2006 | Brown | |
| 7,475,106 B2 | 1/2009 | Agnoli | |
| 7,549,052 B2 | 6/2009 | Haitsma | |
| 7,577,848 B2 | 8/2009 | Schwartz | |
| 7,640,274 B2 | 12/2009 | Tinker | |
| 7,692,666 B1 | 4/2010 | Bourgoin et al. | |
| 7,876,766 B1 | 1/2011 | Atkins et al. | |
| 2003/0097564 A1 | 5/2003 | Tewari | |
| 2003/0200460 A1 * | 10/2003 | Morota et al. ............ 713/200 |
| 2004/0001106 A1 | 1/2004 | Deutscher | |
| 2004/0268224 A1 | 12/2004 | Balkus | |
| 2005/0187756 A1 | 8/2005 | Montgomery | |
| 2006/0029192 A1 | 2/2006 | Duddley et al. | |
| 2006/0161538 A1 | 7/2006 | Kiilerich | |
| 2006/0242550 A1 | 10/2006 | Rahman | |
| 2007/0011256 A1 * | 1/2007 | Klein ............ 709/206 |
| 2007/0067390 A1 | 3/2007 | Agnoli et al. | |

(Continued)

OTHER PUBLICATIONS

OMA Multimedia Messaging Service, Architecture Overview, Approved Version 1.2 Mar. 1, 2005, published by Open Mobile Alliance, available from http://www.openmobilealliance.org/release_program/mms_v1_2.html.

(Continued)

*Primary Examiner* — Kim Vu
*Assistant Examiner* — Yogesh Paliwal
(74) *Attorney, Agent, or Firm* — IP-MEX Inc.; Victoria Donnelly

(57) ABSTRACT

A method for conditioning multimedia containers to be compatible with decoding facilities of receivers of diverse types is disclosed. Content of a multimedia container may include components of different encoding formats. Container conditioning also detects and, where feasible, removes undesirable insertions within each content component of a multimedia container. A content component of a container may be filtered, re-encoded, or deleted. Notifications indicating conditions of a container and any modifications performed are appended to the container. A notification may be presented in at least one form compatible with characteristics of a respective receiver. An editing engine implementing the method is associated with a network entity to which multimedia containers are directed. The editing engine accesses a receiver database storing information on several types of receivers and a repository of notification templates encoded in several forms.

22 Claims, 18 Drawing Sheets

U.S. PATENT DOCUMENTS

| | | |
|---|---|---|
| 2008/0001791 A1 | 1/2008 | Wanigasekara-Mohotti et al. |
| 2008/0140720 A1 | 6/2008 | Six et al. |
| 2008/0196076 A1 | 8/2008 | Shatz et al. |
| 2008/0201386 A1 | 8/2008 | Maharajh et al. |
| 2008/0226173 A1 | 9/2008 | Yuan |
| 2008/0229429 A1 | 9/2008 | Krig |
| 2009/0067357 A1 | 3/2009 | Norton |
| 2009/0125677 A1 | 5/2009 | Leveque |
| 2009/0280844 A1 | 11/2009 | Norton |
| 2010/0114816 A1 | 5/2010 | Kiilerich |
| 2010/0153495 A1 | 6/2010 | Barger |
| 2011/0131298 A1 | 6/2011 | Courtemanche |

OTHER PUBLICATIONS

Open Mobile Alliance document OMA-AD-STI-V1_0-20270515-A "Architecture of the Environment using the Standard Transcoding Interface" Approved Version 1.0—May 15, 2007, published by Open Mobile Alliance.

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

Synchronized Multimedia Integration Language (SMIL) 1.0 Specification, published by W3C organization at http://www.w3.org/TR/REC-smil Jun. 15, 1998.

Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Sep. 9, 2007.

Tayeb Lemlouma, Nabil Layaida "Encoding Multimedia Presentations for User Preferences and Limited Environments" Proceedings of IEEE International Conference on Maultimedia & Expo (ICME), IEEE Computer Society, 2003, p. 165-168.

International Search Report and Written Opinion rendered by Canadian Intellectual Property Office, dated Sep. 30, 2008.

Relational Database System (RDBS), available from http://www.mysql.org/ published by Sun Microsystems, available prior to Nov. 12, 2007.

Request for Comments (RFC)1321 "The MD5 Message-Digest Algorithm", R. Revest, available from http://tools.ietf.org/html/rfc1321 published by IETF (Internet Engineering Task Force) Apr. 1992.

MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

"Internet Content Adaptation Protocol (ICAP)" J. Elson, Request for Comments (RFC) 3597 available from http://www.iett.org/rfc/rfc3507.txt, Apr. 2003.

Multimedia Messaging Service, Media formats and codecs 3GPP TS 26.140, V 7.1.0, http:// www.3gpp.org/ftp/specs/html-info/26140.htm,Jun. 2006.

Synchronized Media Integration Language (SMIL) 2.0 Specification W3C Recommendation http://www.w3.org/TR/smil20/ , Aug. 7, 2001.

"The independent JPEG Group" ftp.uu.net/graphics/jpeg/jpegsrc.v6b.tar.gz, Aug. 3, 2007.

"Multimedia Adaptation for the Multimedia Messaging Service" Stephane Coulombe and Guido Grassel, IEEE Communication Magazine, vol. 42, No. 7, p. 120-126, Jul. 2004.

JPEG—Wikipedia, the free encyclopedia, http://en.wikipedia.org/wiki/JPEG, Aug. 5, 2007.

Advanced Audio Coding—Wikipedia, the free encyclopedia, http://en.wikipedia.org/wiki/Advanced_Audio_Coding, Aug. 5, 2010.

Coskun, Bads, Sankur, Bulent "Robust Video Hash Extraction" article available at <citeseerx.ist.psu.edu/viewdoc/download-?doi=10.1.1.113.9934.pdf> European Signal Processing Conference WUSIPCO 2004.

* cited by examiner

Original Container

| | | | | | |
|---|---|---|---|---|---|
| Component(1) | Component(2) | Component(3) | Component(4) | Component(5) | Component(6) |
| Component-Type (1-A) | Component-type (2-A) | | Component-type (3-A) | | Component-Type (4-A) |

| | | | | | |
|---|---|---|---|---|---|
| Component(1) *Pass* | Component(2) Virus X | Component(3) *Pass* | Component(4) *Pass* | Component(5) Virus Y | Component(6) Virus X |

Receiver 1

| | | | |
|---|---|---|---|
| Component-Type (1-C) | Component-Type (2-A) | Component-Type (3-A) | Component-Type (4-E) |

Receiver 2

| | | | |
|---|---|---|---|
| Component-Type (1-A) | Component-Type (2-W) | Component-Type (3-B) | Component-Type (4-A) |

*FIG. 15*

Output Container to receiver 1

| | | | | | |
|---|---|---|---|---|---|
| Component(1) Translated to Type (1-C) | Component(2) Virus X removed | Component(3) No change | Component(4) No change | Component(5) Deleted: Virus Y not removed | Component(6) Translated to Type (4-E) Virus X removed |

Output Container to receiver 2

| | | | | | |
|---|---|---|---|---|---|
| Component(1) No change | Component(2) Translated to Type (2-W) Virus X removed | Component(3) Translated to Type (2-W) | Component(4) Translated to Type (3-B) | Component(5) Deleted: Virus Y not removed | Component(6) Virus X removed |

GENERATION AND DELIVERY OF MULTIMEDIA CONTENT-ADAPTATION NOTIFICATIONS

CROSS REFERENCE TO RELATED APPLICATIONS

The present application claims the benefit of U.S. provisional application Ser. No. 60/976,145 filed Sep. 28, 2007, the contents of which are incorporated herein by reference.

FIELD OF THE INVENTION

The present invention relates to multimedia messaging services and, in particular, to a method and system for notifying users of modifications performed during message-transcoding processes within a network.

BACKGROUND

Multimedia messaging provides an outstanding business opportunity for mobile network operators. The higher access capacity available with third generation (3G) wireless access have paved the way for richer messages that include various combinations of text, voice, still and animated graphics, photos, video clips, and music. To capitalize on this massive market potential, however, network operators must ensure quality and reliability. Currently, operators are confronted with problems that impede interoperability across different networks and among the wide variety of multimedia formats and wireless devices. Multimedia messages may not be delivered successfully due to incompatible capabilities of an originating terminal and a destination terminal. The incompatibility may relate to message size, encoding methods, or file format. The problem occurs in both peer-to-peer and application-to-peer messaging.

Multimedia content adaptation directly addresses these interoperability issues. Adaptation allows dynamic transcoding of multimedia elements, including multimedia messages. Dynamic transcoding of multimedia elements adapts them to match the characteristics of the receiving devices so that users have universal access to multimedia content and their experience meets their expectations for quality. In an adaptation scheme, a requesting application sends requests to a transcoding device. Multimedia content adaptation ensures interoperability between devices within a network and across networks that follow different standards.

Content elements in a multimedia message may be altered or even removed during adaptation. It is desirable that a recipient, and perhaps a sender, of a modified message be informed of the nature of modification. There is a need, therefore, for a system for generation and delivery of appropriate notifications.

SUMMARY

In accordance with one aspect, the present invention provides a method for processing a message in a multimedia messaging system. The method comprises an initial step of examining the message to remove any present malicious software followed by steps of identifying an intended receiver of the message and resolving any incompatibility of the message with characteristics of the intended receiver.

The condition of the message is characterized, according to a result of the examining and a result of the resolving, by at least one key-value pair and a condition type. A notification template corresponding to the condition type is identified and retrieved from a repository of notification templates. A notification is subsequently composed, using the notification template and the at least one key-value pair, and appended to the message. Notifications of a common condition type may be merged in a single notification. A notification may be sent to an originator of the message. The key-value pair and the condition type characterizing a message may be sent to a server associated with the multimedia messaging system which maintains notification records for statistical service-analysis and service planning purposes.

The step of examining comprises detecting presence of malicious software in all content components of the message, including attachments. The step of resolving comprises steps of determining capabilities of the intended receiver and translating, where necessary, a content component of the message from a current format to a different format compatible with the receiver's capabilities.

A key of a key-value pair may indicate a content-component name, a cause of content removal, a virus name, or a virus scanning engine. A value in a key-value pair may indicate a specific content-encoding method, an identifier of a specific virus, an identifier of a specific engine used to detect and remove a virus, or an indication of a message size and corresponding size limit.

In accordance with another aspect, the present invention provides a method of processing a data container comprising multiple content components. The method comprises steps of receiving the container at a container conditioner, parsing the container, and editing the content components. Parsing determines an identifier of a transmitter, identifiers of addressed receivers of the container, and properties of each content component. Each content component is initially examined to detect and delete harmful insertions, and mark the container accordingly. Compatibility of the content components with each of the addressed receivers is then determined according to the properties of each content component and the characteristics of each of the addressed receivers. Where the properties of a content component are incompatible with a receiver, the content component is adapted to suit the receiver.

A notification specific to each receiver is produced indicating an initial condition of the container and any modification made, including deletion of harmful insertions and content adaptation to suit characteristics of a receiver. A notification to a receiver may indicate that the container was free of harmful insertions and compatible with the receiver. A notification is appended to the container to be sent to a respective receiver. A notification may also be sent to a transmitter of the container.

A notification may be formed as a plain text or as a combination of several presentation forms which may include a text, an image, an encoded audio signal, and an encoded video signal.

The method further comprises steps of determining a permissible size of the container according to characteristics of each receiver. Where a current size of the container exceeds the permissible container size, at least one content component may be considered for deletion, compression, or translation from one encoding form to another encoding form.

The method further comprises steps of determining a state of a path from the container conditioner to each receiver and determining a permissible size of the container according to both the path state and characteristics of each receiver.

In accordance with a further aspect, the present invention provides an editing engine for conditioning multimedia containers. The editing engine comprises a computing device having computer readable instructions stored hereon, which when executed, cause the computing device to receive a container, parse the container into content components, and determine encoding formats of the content components. The editing engine examines each content component to detect presence of malicious insertions and perform corrections of the content components where malicious insertions are found. The editing engine further identifies a receiver of the container, acquires characterization of decoding facilities of the receiver, determines compatibility of the decoding facilities to the encoding formats, and formulates appropriate condition codes of the container according to the corrections and the compatibility. A notification is synthesized according to the appropriate condition codes and appended to the container. The notification is synthesized by accessing a versatile dictionary storing a comprehensible description, which may be in multiple display formats, of each of a plurality of condition codes.

The computer readable instructions further cause the computing device to decide whether to accept an encoding format of a content component, translate the content component encoded from a current encoding format to a new encoding format compatible with a corresponding decoding facility from among the decoding facilities of the receiver, or delete the content component.

The editing engine further comprises additional computer readable instructions, which when executed cause, the computing device to determine display formats provided by the versatile dictionary, select at least one display format compatible with the decoding facilities of the receiver, and instruct a controller of the versatile dictionary to provide descriptions of the appropriate condition codes in at least one display format.

The editing engine acquires the characterization of decoding facilities by accessing a receiver database storing information on decoding facilities of each receiver type from among a group of receiver types.

The computer readable instructions further cause the computing device to identify additional receivers of the container, acquire characterization of decoding facilities of each of the additional receivers, and determine conformity of the encoding formats of the content components to the decoding facilities of each additional receiver. Receiver-specific condition codes of the container are then formulated according to corrections, if any, made to content components and conformity of each content component to decoding facilities of a specific additional receiver. Receiver-specific notifications, specific to each of the additional receivers, are synthesized according to respective receiver-specific condition codes.

The computer readable instructions further cause the computing device to determine a current size of the container, including a notification, and determine a size upper bound dictated by each receiver under consideration. Where the current size exceeds the size upper bound, one of the content components may be deleted according to a preset priority order. Where the current size does not exceed the size upper bound, the notification is appended to the container. A notification may be sent to an originator of the container.

BRIEF DESCRIPTION OF THE DRAWINGS

In the figures which illustrate example embodiments of this invention:

FIG. 15 illustrates exemplary conditioning of a container directed to two receivers, the conditioning involving virus removal and adaptation of content components to encoding facilities of the two receivers, in accordance with an embodiment of the present invention;

FIG. 16 illustrates output containers resulting from the conditioning processes of FIG. 15;

DETAILED DESCRIPTION

Terminology

Figure 1:
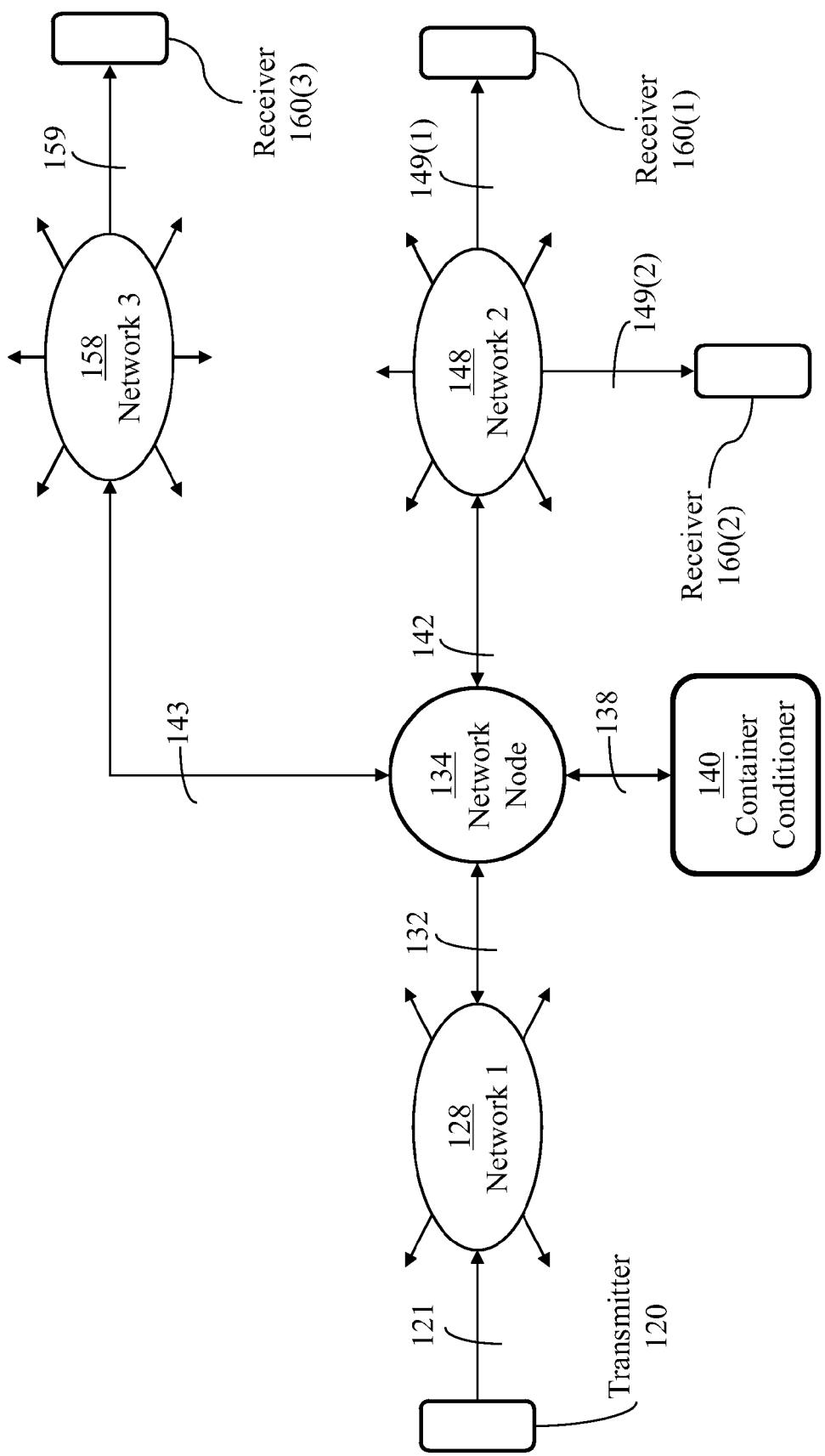
FIG. 1 illustrates a container conditioner associated with a network node for examining, and where necessary altering, multimedia containers, and generating notifications indicating a state of each container, in accordance with an embodiment of the present invention.

Medium: The term "medium" refers to any hardware means for storage and delivery of information. The term "multimedia" refers to a medium communicating information of multiple content forms. The content forms may include encoded text, audio signals, still images, animation (rapid display of images), and video signals.

Multi-Media Service (MMS): The term is used colloquially to refer to multi-content communication services where information contents of different forms such as text, audio signals, video signals, images, presentations, etc., are exchanged among terminals through a network. Encoded information transferred from one terminal to another is typically arranged in a single data stream with time-interleaved segments corresponding to the different information contents.

Container: A container is a computer file stored on a computer readable medium and transmitted over a computer network. The container is structured to contain various types of data. The container may support multiple text, audio, and video streams with synchronization information to enable coordinated play back of various streams.

Container component: A container includes sections, each comprising data encoded in a specific form, such as a text, audio data, image data, or video data. The term container component refers to data in one section. A container component may be referenced as a "component" for brevity. In a multimedia messaging system, a component is also known as "media".

Container screening: "Container screening" refers to a process of examining the content of a container, including all components, to ensure absence of any undesirable insertions, especially harmful insertions.

Container adaptation: "Container adaptation" refers to a process of modifying the form of a container component found to be incompatible with the decoding capability of a respective receiver. If it is not feasible to present a container component to suit a receiver, the container component may be deleted. A container-adaptation process is receiver specific while the process of container screening is independent of the type of intended receiver.

Container editing: The term "container editing" refers to the combined processes of container screening and container adaptation.

Container conditioning: The term may be used synonymously with "container editing". However, container conditioning also appends an appropriate notification with a container, even when a container is not modified.

Compression: The term refers to data compression where data of a container component may be re-coded to use fewer bits. Compression may or may not affect the information content of a component.

JPEG: JPEG a commonly used method of data compression for photographic images developed by the Joint Photographic Experts Group. The degree of compression can be adjusted, allowing a selectable tradeoff between storage size and image quality.

Advanced Audio Coding (AAC): AAC is a standardized encoding scheme for digital audio signals.

3GP: The acronym refers to a multimedia container format for use with mobile phones.

Transcoder: A transcoder is a device which performs direct digital-to-digital translation of encoded information to enable an information record of one format to be reproduced in a different format suitable for a specific receiver.

Transcoding

In a telecommunications network connecting transmitters of different types to receivers of different types, a transmitter devised to transmit signals encoded in a certain form may connect to a receiver devised to receive signals encoded in the same form through a passive path through the network. If the receiver is devised to receive signals encoded in a form different from the transmitted form, an intermediate device—a transcoder—provided somewhere along the path—would be needed to modify the transmitted signal to be compatible with the receiver's capability.

In a network supporting terminals (transmitters and receivers) exchanging homogeneous data, such as plain-text data or encoded voice-signals, the terminals are likely to be compatible. In a network supporting versatile terminals exchanging data streams of heterogeneous content, where a single data container may include data representing plain alphabet characters, encoded audio signals, encoded video signals, static images, presentations, etc., problems of transmitter-receiver incompatibility are likely to arise. The process of communicating data representing information of more than one type is often referenced as multimedia communications or multimedia services (MMS), where the term "media" refers to an information type. Multimedia services are commonly based on exchanging multi-content messages (data containers).

A significant amount of work has been devoted to enhancements of multimedia services. However the issue of notifying users of message alterations performed during transcoding and necessitated by limitations of receiving terminals or viral contamination, has been largely overlooked. The embodiment of this invention fills this gap by providing a generic warning system using notifications inserted in a presentation of an altered message to inform a recipient of the message that the message has been altered in a way that affects the final presentation of the message. If, for example, a content element of a message is removed, then a "Synchronized Multimedia Integration Language" (SMIL) slide with text notification of the removal is inserted into the message.

SMIL is a standard language devised by the World Wide Web Consortium for creating multimedia presentations where audio, video, text and graphics are combined and coordinated in real time. SMIL is used to define markups for timing, animations, and media embeddings associated with a multimedia presentation. SMIL enables displaying multiple file types such as text, video, and audio.

An MMS message is a container that has a SMIL presentation that may reference media attachments as components of the MMS message (images, video, text, audio). The presentation is displayed as a slide show, which displays the content within the message. When the content is altered, for example when a video recording that is too large is removed, or when an image is removed because of a virus, a new text slide is generated, based on, e.g., a template corresponding to the specific reason, and inserted into the slide show. The slide is built from a language-selectable template which inserts information relevant to the notification content in the correct position.

The embodiment of the present invention provides a method for intelligently deciding when to insert the attachment notification based on a set of states: adaptations, filtering, and removal. A notification template is acquired from a repository, which may be available locally or at a remote location accessible through a network, based on language and character set, and a text notification is created filling in details specific to the notification. The notification may be inserted into the message presentation or communicated separately.

Different types of actions, such as adapting, filtering, and removal may be performed on attachments originally contained within a message. Content removal may be necessitated by: an error occurring while manipulating media message, e.g., successfully parsed content considered invalid; restricted message size; content-filtering; detecting a virus; or the whole content being a virus.

A removal notification may not be generated for each possible case in which content is removed from a message. For example, content that cannot be parsed successfully from an original message and, hence, is not extracted from the original message is ignored and no removal notification need be included in the output message. Whenever content is removed, a method according to an embodiment of the invention evaluates whether or not to actually add a respective notification. So if it is appropriate to add a removal notification, then the message is marked appropriately.

Optionally, a number of removal events may be amalgamated in one notification. Only one notification of each type would ever be created. For example, even if multiple attachments are removed, only one removal notification may be added to the output message.

Upon creating the removal notification, the system evaluates all media attachments that have a "removed" state and that were marked as appropriate for creation of removal notification. If the removal notification template contains variables, then the system replaces the variables with appropriate values from the characteristics of the content being removed and appends the entry to the removal notification being created. On the other hand, if the removal notification template contains generic text and no variables then only one entry is added in the removal notification being assembled. When a removal notification is created, a notification is added as a new attachment to the output message and to the presentation being built.

Network Considerations

FIG. 1 illustrates paths from a transmitter 120 to a number of receivers 160, individually identified as 160(1), 160(2), 160(3), etc. Transmitter 120 sends data containers (MMS messages) directed to selected receivers 160 through a channel 121 to a node in a network segment 128, labeled "network 1". A container conditioner 140 comprises a computing device having a processor and a computer readable medium, e.g., a random access memory, having computer readable instructions stored thereon. The container conditioner 140 is associated with a network node 134 which connects to network segment 128 through a link 132. The container conditioner 140 examines a data container received from transmitter 120 and directed to a receiver 160 to determine compatibility with the receiver's capability. The container conditioner 140 may also acquire information on a current condition of a designated path to a specific receiver 160 through other network segments, such as network segment 148, labeled "Network 2" and network segment 158, labeled "Network 3".

The container conditioner 140 receives data containers from network node 134 through a link 138 which may comprise several channels. Network node 134 transmits examined data containers to receivers 160(1) and 160(2) through a link 142 to a first node (not illustrated) in network segment 148. A data container directed to receiver 160(1) is switched to a second node (not illustrated) within network segment 148 connecting to receiver 160(1) through a channel 149(1). A data container directed to receiver 160(2) is switched to a third node (not illustrated) within network segment 148 connecting to receiver 160(2) through a channel 149(2). Likewise, network node 134 transmits examined data containers to receiver 160(3) through a link 143 to a first node (not illustrated) in network segment 158 from which a data container is switched to a second node (not illustrated) within network segment 158 connecting to receiver 160(3) through a channel 159. Link 142 may comprise multiple channels and similarly link 143 may comprise multiple channels.

Any of channels 121, 149, or 159, or links 132, 142, and 143, may be configured within a wireless or wireline communication medium.

Container conditioner 140 may acquire receiver characterization data for a number of receivers and maintain the receiver-characterization data in a storage medium for recurrent use. The receiver-characterization data may be acquired through registration where each added receiver communicates its own characteristics to the container conditioner 140. Alternatively, the container conditioner 140 may query receivers to which data containers are directed.

The container conditioner 140 receives a container and may alter the content of the container to remove malicious insertions, or any other undesirable insertions, or to adapt the content to the capability of a receiver. If the container is found to be free of undesirable content and compatible with a receiver, the container is forwarded in its original form, except—perhaps—for appending an indication that container has not been altered.

A container may comprise multiple content components which may be of different component types, such as text, audio data, image data, and video data. A component type may be encoded in one of several formats. For example, several protocols, standardized and proprietary, exist for encoding, compression, storage, and transmission of audio and video digital signals. The container may be directed to more than one receiver of different receiver types and a component may be incompatible with some receivers.

A component may include one of many types of malicious insertions which may be detected using a variety of specialized software tools.

Figure 2:
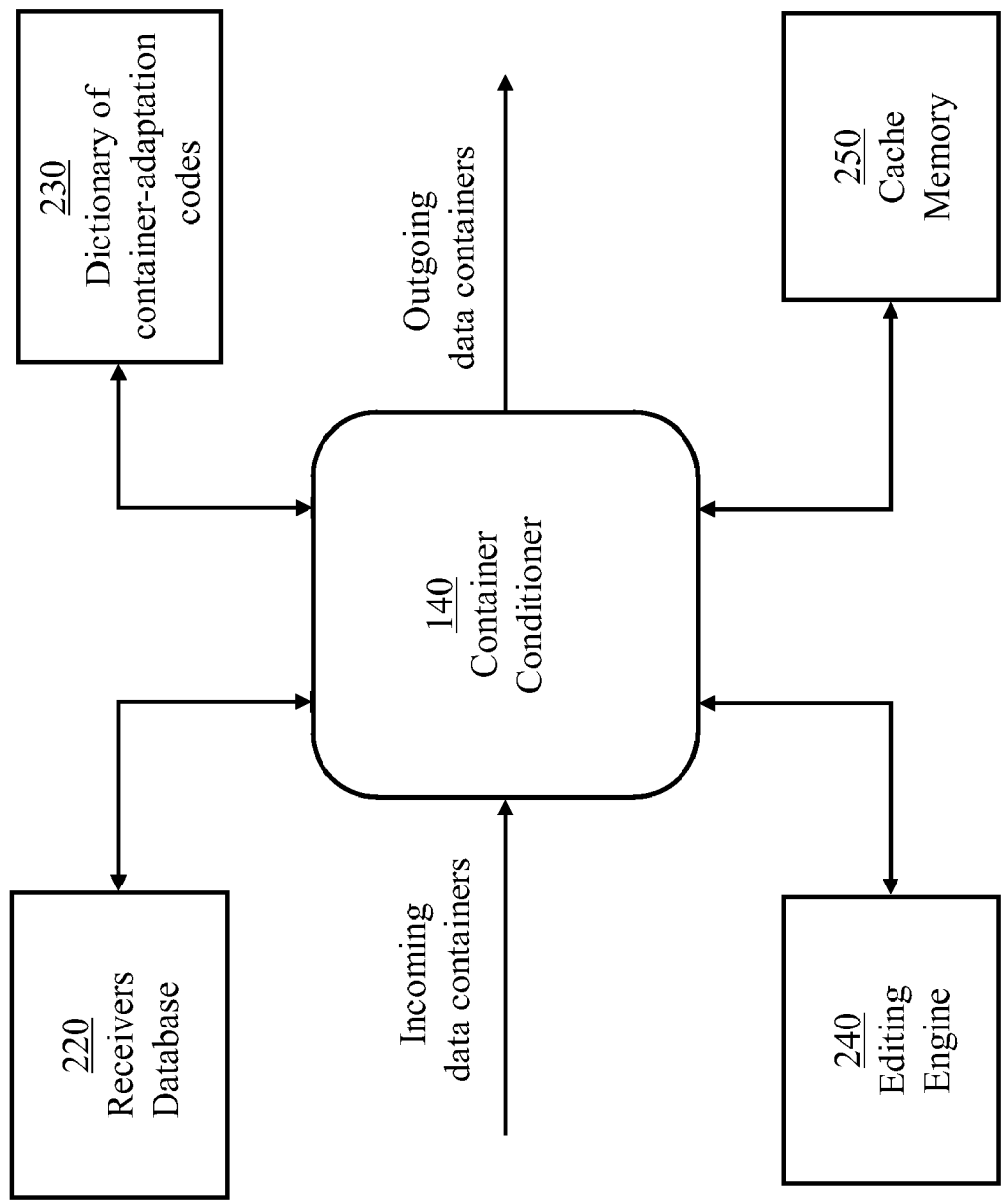
FIG. 2 illustrates components associated with the container conditioner of FIG. 1.

FIG. 2 illustrates devices associated with the container conditioner 140. Container conditioner 140 may be connected to a host node, such as node 134 (FIG. 1), in different ways, as will be described with reference to FIG. 17 and FIG. 18. The output containers of container conditioner 140 are switched through the host node to their respective destinations.

Container conditioner 140 is associated with a receiver database 220, which maintains characteristics of a number of receivers, and an editing engine 240 which modifies containers having harmful or undesirable content, or having content incompatible with a destined receiver. Editing engine 240 produces adaptation codes to identify changes made to a container; a "Null" adaptation code may be associated with an unchanged container. Container conditioner 140 may also access a dictionary 230, which provides a comprehensible description of each adaptation code, and a cache memory 250 which holds data acquired by querying specific receivers and results of recent containers' examination.

Container conditioner 140 determines addressed receivers indicated in each incoming data container and accesses receiver database 220 to determine capabilities of the addressed receivers. The editing engine 240 may query a destined receiver for which no characterizing data is stored in receiver database 220 and hold acquired characterizing data in cache memory 250. The editing engine 240 implements a method for determining whether certain content parts of a container destined to a specific receiver need be changed to suit the capabilities of the specific receiver. Modifications of several types may be made to parts of a data container and each modification type is internally identified by an adaptation code. Dictionary 230 provides an intelligible description of each adaptation code for delivery to a receiver of an adapted container and to a transmitter of the adapted container. The adaptation codes resulting from examining containers may be sent to a processing unit (not illustrated) for statistical analyses and for service evaluation and planning purposes.

The editing engine 240 comprises a processor (not illustrated) and a memory device (not illustrated) having stored thereon a container-editing software for executing the method of the embodiment of the invention. The container-editing software may be acquired from a software medium which could be a disk, a tape, a chip or a random access memory containing a file downloaded from a local source or from a remote source through a network.

The receiver database 220 comprises encoded characteristics of a set of receiver types stored on a computer readable medium of a computing device (not illustrated) loaded with information retrieval software. Receiver-characteristic information is needed for adapting container-content and generating relevant notifications. The information retrieval software may be acquired from a software medium which could be a disk, a tape, a chip or a random access memory containing a file downloaded from a local source or from a remote source through a network.

The versatile dictionary 230 comprises notification patterns encoded for different forms of display, such as a text, an audio signal, an image, etc. stored on a computer readable medium of a computing device (not illustrated). The dictionary 230 may be acquired from a software medium such as a disk, a tape, a chip or a random access memory containing a file downloaded from a local source or from a remote source through a network.

Figure 3:
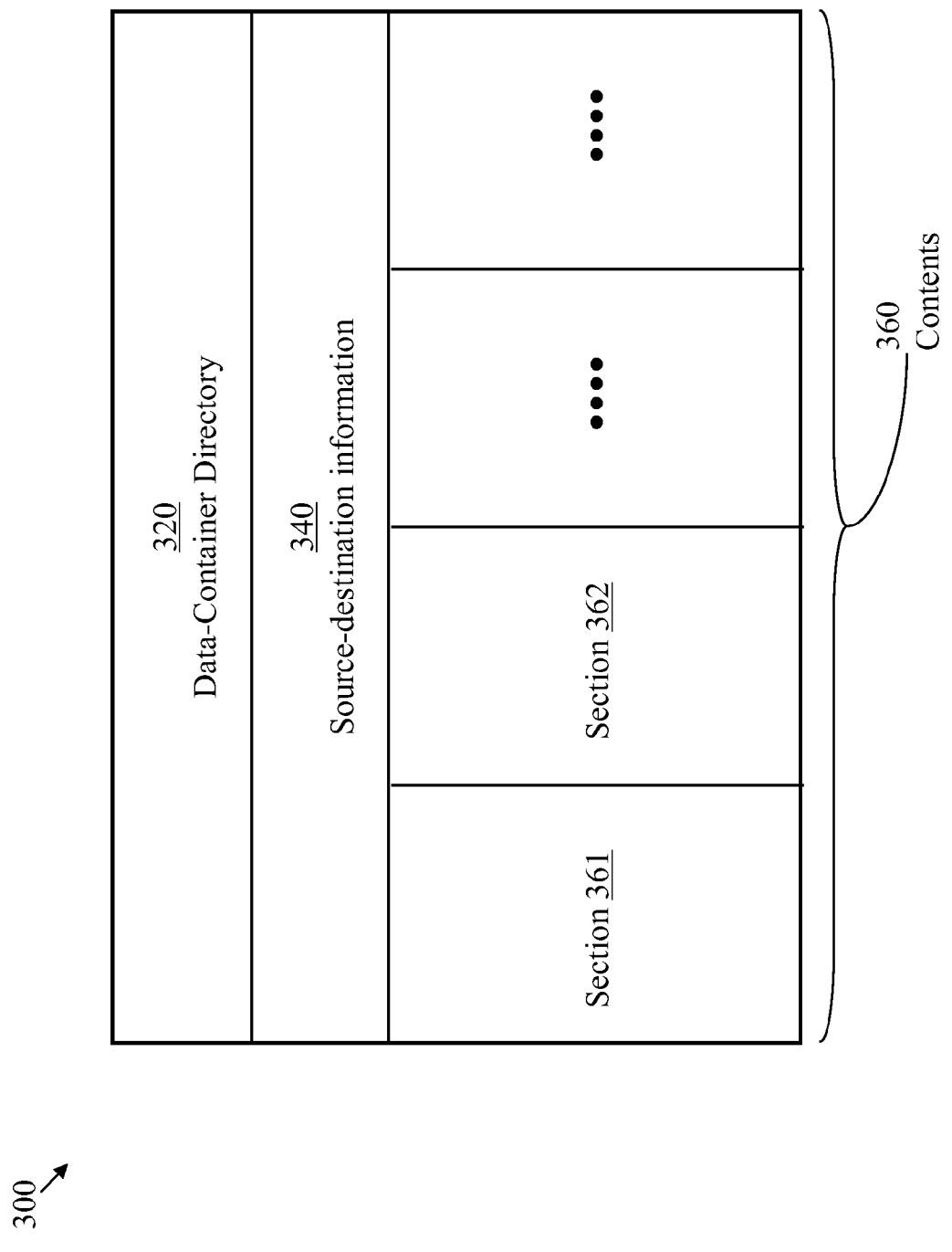
FIG. 3 illustrates a generic form of a data container which may be encoded in a variety of ways.

Any of well known data structures may be used to organize containers' data in a manner which facilitates containers' examination and adaptation. FIG. 3 illustrates a generic form of a data container 300 which may be structured in a variety of ways. Container 300 comprises a first part 320 containing a directory which defines the organization of the rest of the container, a second part 340 containing source-destination information, and a third part 360 containing the content (i.e., the payload) of the container. In a composite container, the content part 360 may comprise several sections 361, 362, ..., which may store data encoded in different forms. For example, a section of the content part 360 may include data encoded as one of a plain text, an encrypted text, a high-fidelity voice message, a high-quality video, a static image, a paced display, etc.

Figure 4:
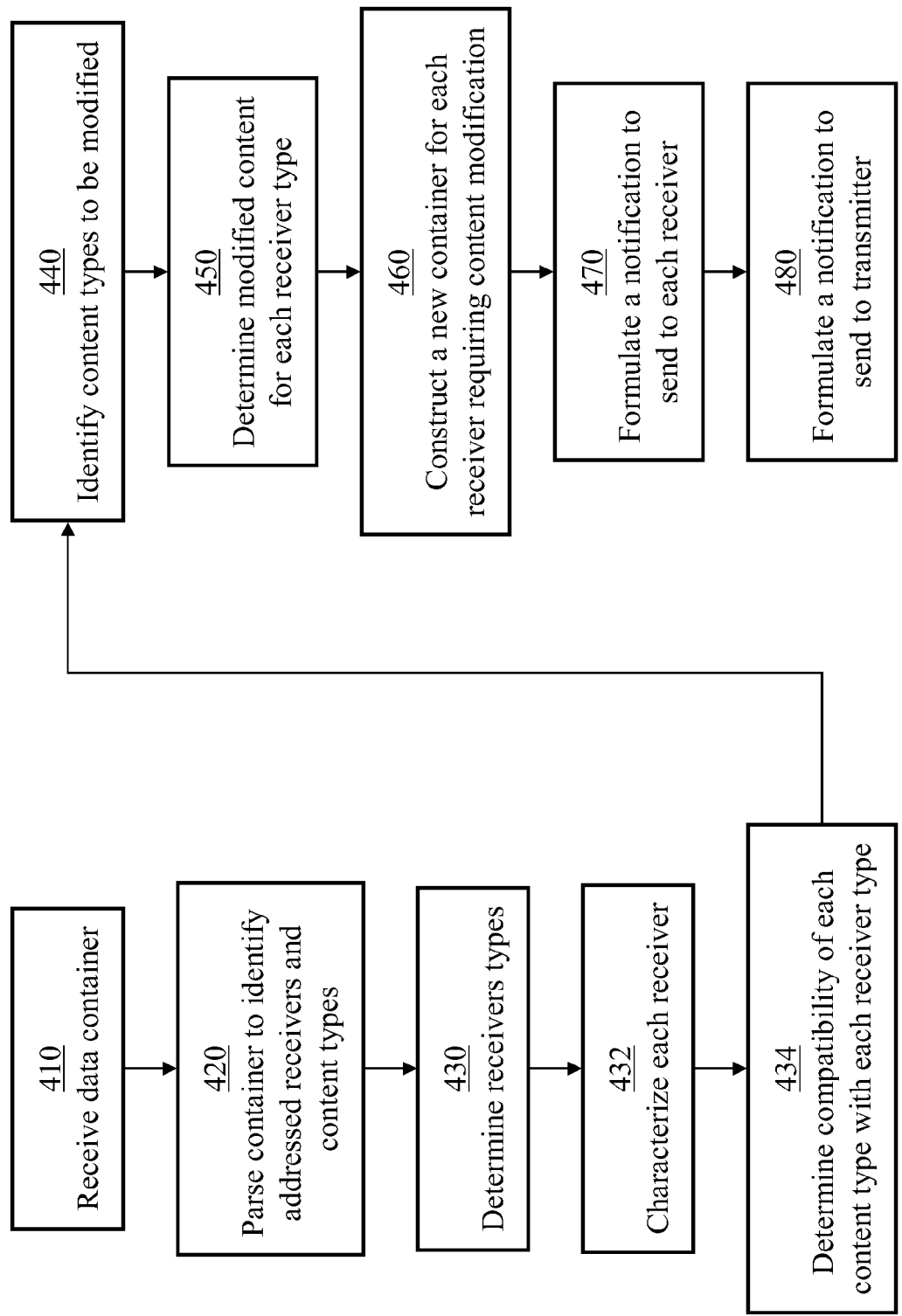
FIG. 4 illustrates functions of a container conditioner in accordance with one embodiment of the present invention.

FIG. 4 illustrates functions of a container conditioner 140 in accordance with one embodiment of the present invention. A container conditioner 140 receives a data container from a transmitter 120 (step 410). The container conditioner then performs the series of functions indicated in steps 420 to 480. In step 420, container directory 320 is parsed to determine pointers to addressed receivers encoded in the source-destination part 340 of the container and the content components encoded in the content part 360 of the container. In step 430, the type of each addressed receiver is determined according to the receiver's address from receiver addresses stored in associated receiver database 220, from cache memory 250 holding data on recent transactions, or by directly querying a respective receiver.

The number of receivers served by a single container conditioner 140 may be enormous, but the number of receiver types is likely to be quite small; less than a hundred for example. Thus, container conditioner 140 preferably stores basic characterizing information on receiver types to be used to determine relevant characteristics of an addressed receiver (step 432). Receivers of a given type may, however, be configured differently leading to different capabilities, in which case such receivers may be individually identified in receiver database 220.

A received data container may be a composite container carrying payload data (content) of several content types. An addressed receiver may not be able to process contents of specific types. Step 434 determines which content types, if any, are incompatible with capabilities of an addressed receiver. If step 434 determines that the content in its entirety is compatible with the addressed receiver, steps 440 to 480 are skipped; the data container is left intact and transmitted to a subsequent node towards destination. Otherwise, step 440 identifies content parts to be modified. The conditional transition from step 434 to step 440 is not illustrated in FIG. 4 to avoid cluttering the figure with obvious steps.

In step 450, the required content modifications are determined and replacement parts of the content are produced. Step 450 implements a screening-adaptation procedure for determining the form and extent of each modification. The procedure determines whether a specific part of the content need be deleted, corrected, or translated to another form. Step 450 is further detailed in FIG. 6.

In step 460, a new container is produced to replace the received container. While the new container may include most of the information contained in the received container, even minor payload (content) changes may force changes in the container's directory and size.

In step 470, a notification is formulated to be sent to a respective receiver of an altered data container. In its simplest form, a notification may be a numerical code, or a set of numerical codes, to accompany an altered data container. A notification may, however, be produced in one of comprehensible forms such as a clear text, an intelligible voice message, or an image. A notification may also combine two or more comprehensible forms.

In step 480, the container conditioner 140 may produce a notification, in any of the above forms or any combination thereof, to be sent to the transmitter 120. A notification sent to a transmitter may carry further information to enable the transmitter to correlate the notification with a respective, already transmitted, data container.

A container received at container conditioner 140 and directed to multiple receivers may be modified for only one receiver and left intact for the remaining receivers, in which case container conditioner 140 may send the modified container accompanied by a notification in the form of a comprehensible text, for example, to the respective addressed receiver.

Notably, modifying a data container to be compatible with an addressed receiver is needed for proper reception and processing of the data container. However, an associated comprehensible notification is provided for the benefit of a human user of the receiver. The comprehensible notification may also be sent to the transmitter for the benefit of a human user of the transmitter.

Frequent notifications related to common causes, such as a container size exceeding a preset limit, methods of video encoding, and methods of data compression, may be sent as numerical codes to be translated into comprehensive texts (or other comprehensible modes such as clear voice messages) at a respective receiver.

Figure 5:
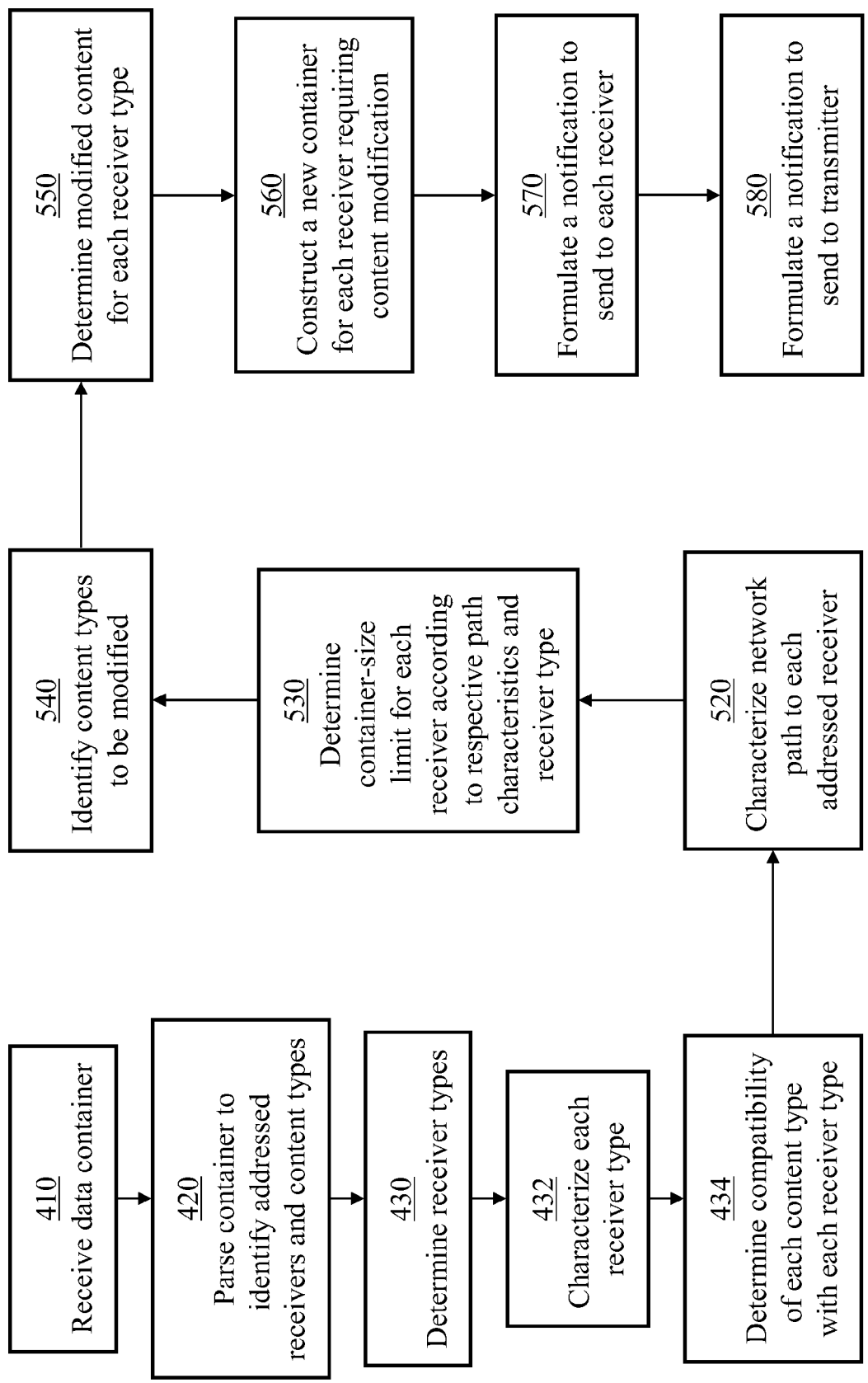
FIG. 5 illustrates functions of a container conditioner in accordance with another embodiment of the present invention.

FIG. 5 illustrates functions of a container conditioner 140 in accordance with another embodiment. In the process of FIG. 4, a part of a container's content is modified if found to be incompatible with corresponding capabilities of an addressed receiver. In the process of FIG. 5, characteristics of a path to an addressed receiver are also considered in deciding alterations to a data container.

Steps 410, 420, 430, 432, and 434 in FIG. 5 are identical to likewise-numbered steps in the process of FIG. 4. In step 520, the container conditioner 140 may acquire network-related data to characterize a path, or at least a segment of a path, to an addressed receiver. A current condition of the path may force a size reduction of each container traversing the path to avoid data loss at a node along the path (step 530). As in the case of FIG. 4, container-size reduction may also be dictated by limitations of an addressed receiver.

If step 530 determines that the content size and the content in its entirety are compatible with the addressed receiver and conforming to a condition of a designated path to the addressed receiver, the data container is transmitted in its original form to a subsequent node towards destination and steps 540 to 580 are skipped. Otherwise, step 540 is exercised. The conditional transition from step 530 to step 540 is not illustrated in FIG. 5.

In step 540, a procedure for judicious selection of content parts to be modified is exercised. For example, a data container may include a video signal encoded for high-quality reproduction accompanied by an encrypted text or an encoded audio signal. To reduce a container size to a specified value, the procedure has to choose from a number of options such as: deleting the text, deleting the audio content, or decoding and re-encoding the video content using an alternative encoding technique which produces an encoded record of a smaller size. Selection of an option may be influenced by a predetermined priority classification of the content components of a container. Thus, if one of a text or an image is to be sacrificed, the editing engine 240 may base the decision on a priority classification of the two components.

In step 550, modified content is produced according to a decision made in step 540. Step 550 is similar to step 450 which is detailed in FIG. 6. In step 560, a new container is produced to replace the received container. In step 570, a notification is formulated to be sent with an altered data container to a respective receiver. In step 580, the container conditioner 140 may produce a notification to be sent to the transmitter.

The steps of FIG. 4 and FIG. 5 are implemented according to instructions stored in a computer readable medium, such as a semiconductor-based integrated circuit, a flash memory device, a compact disc (CD), or a digital versatile disc (DVD).

Container Editing and Adaptation

A container received at container conditioner 140, and stored in the memory thereon, may be directed to multiple receivers of different capabilities, which may result in dissimilar output containers directed to respective receivers. A received container, which is found to include malicious software or other undesirable data strings is edited first to remove affected content before individually adapting the container, if necessary, according to respective destinations.

Figure 6:
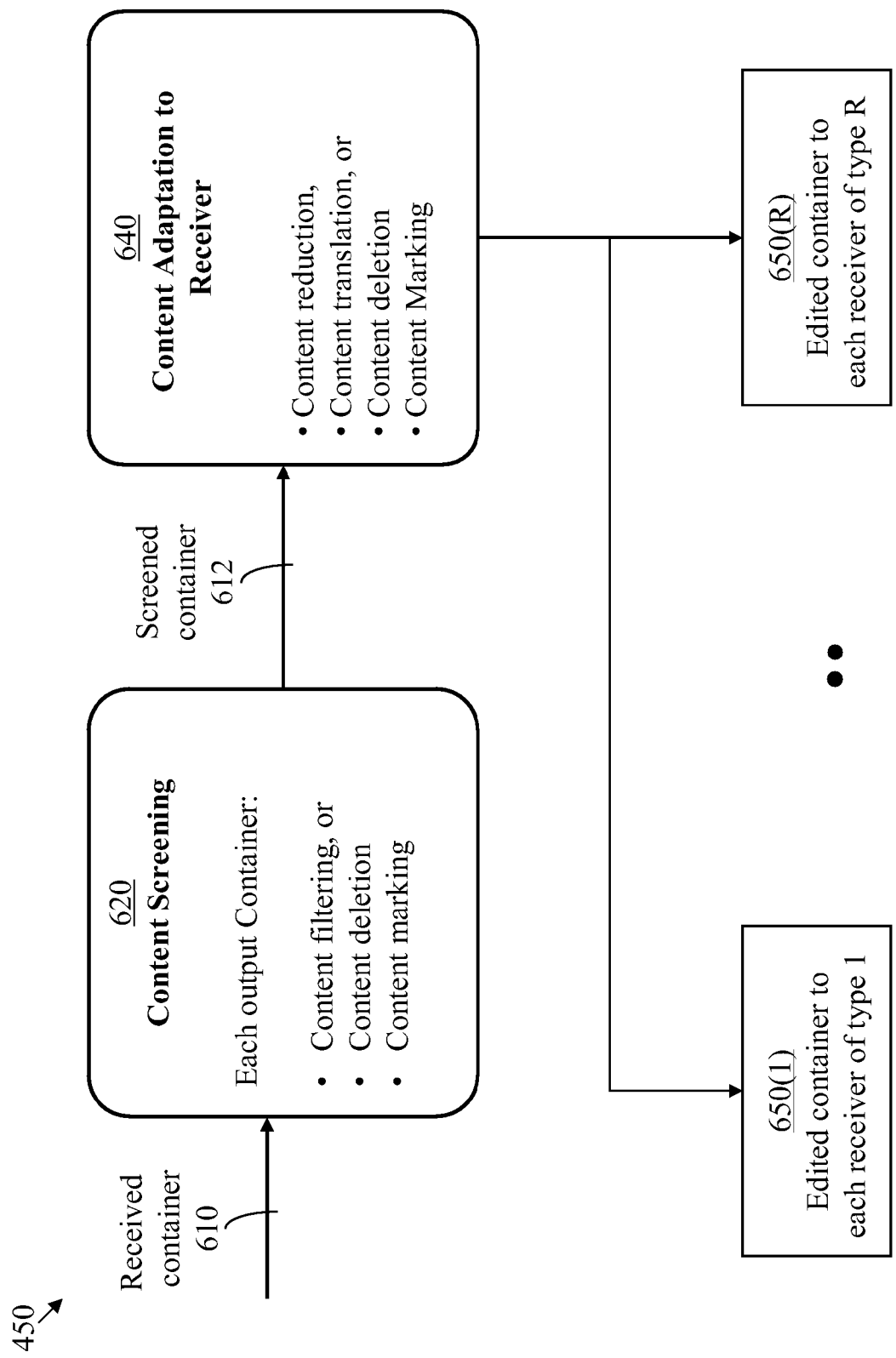
FIG. 6 details a process of modifying a container in accordance with an embodiment of the present invention.

FIG. 6 details step 450 of FIG. 4 (or step 550 of FIG. 5). A container 610 received at the container conditioner 140 is first examined in a content-screening module 620, which may delete an entire content component or filter out undesirable insertions, if any. The screened container 612 is marked to indicate whether any alterations were performed. When no modification takes place, the screened container 612 is identical to the received container 610 except for an associated indication of the screening result.

The screened container 612 may then be adapted in content-adaptation module 640 to suit each addressed receiver type. Content-adaptation module 640 may filter out part of a content component, decode a content component and re-encode the decoded data to a form compatible with a respective receiver, or delete an entire content component. With R receiver types (R≧1), R output containers, 650(1), ..., 650(R), are produced and directed to respective receivers. The content of an output container directed to a specific receiver may be identical to the content of received container 610 or may be altered in either or both of the content screening module 620 and the content adaptation module 640. In any case, a notification is generated to indicate the condition of the container and actions taken, if any.

The combined content-screening module 620 and content-adaptation module 640 constitute an editing module. The editing module may be implemented as special purpose circuitry. Preferably, however, the editing module is implemented as a computing device having stored thereon computer readable instructions which, when executed, cause the computing device to screen content of containers and, where necessary, adapt content of containers to be compatible with characteristics (such as decoding facilities) of respective receivers. The computer readable instructions also cause the computing device to mark containers according to results of screening and adaptation.

Data-Container Structure

Figure 7:
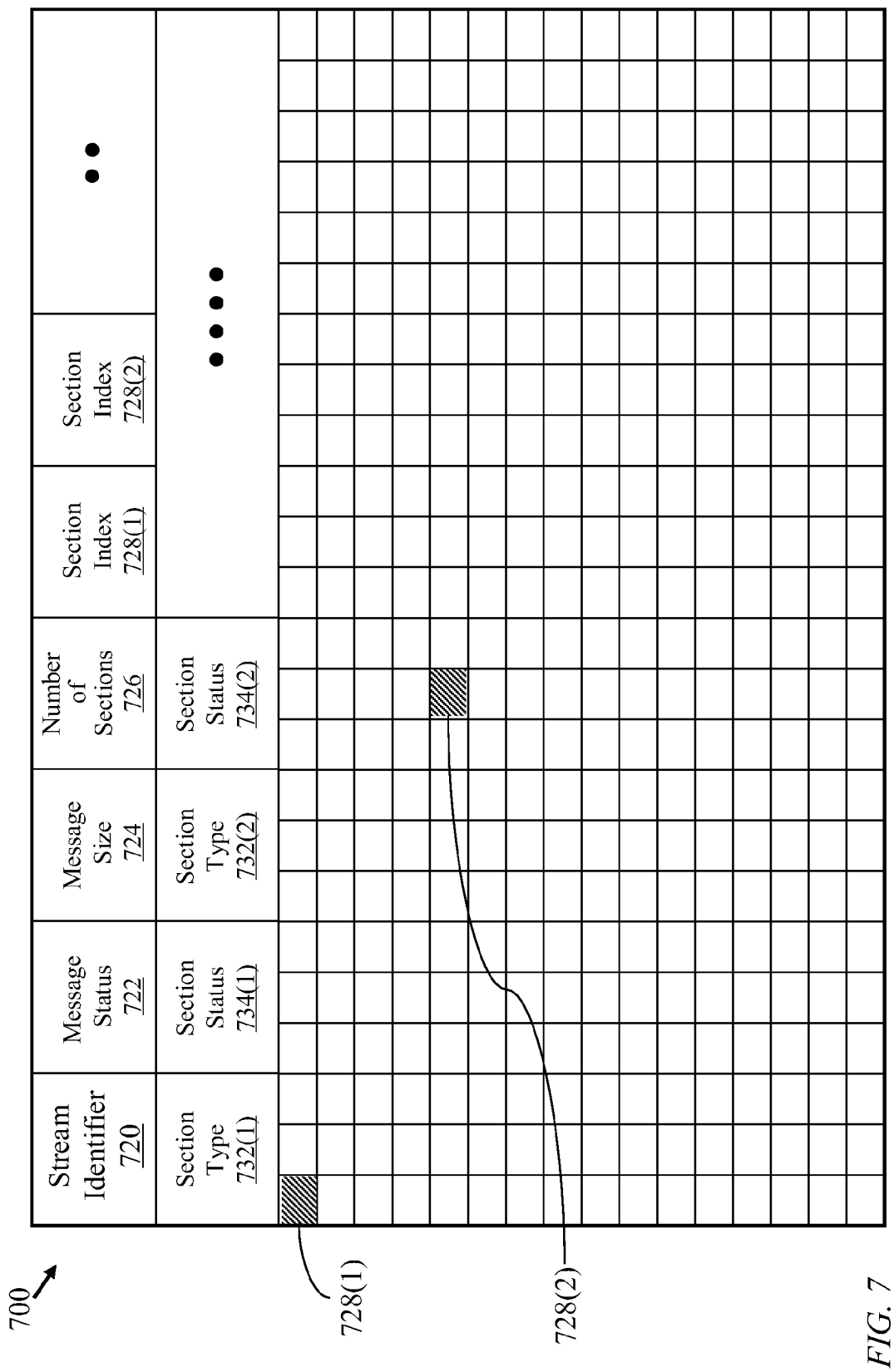
FIG. 7 illustrates an exemplary structure of a data container comprising a header part and a content part.

FIG. 7 illustrates a composite data container 700 comprising a header part and a content part. The header part comprises external identification data and internal identification data. The content part comprises multiple sections each section corresponds to a respective information type and data format. The content of a section constitutes a content component (often referenced as a "media").

A variety of container structures may be used. The structure of FIG. 7 corresponds to a data container belonging to a data stream for which a connection has been established. Thus, a single stream identifier 720 suffices to replace field 340 for determining an address of a source, an address for a destination in a unicast connection, an address of each destination in a multicast connection, and relevant routing information.

The content of container 700 may be modified, for any of a variety of reasons, at a point along the container's path from source to destination. Thus, the container's size may change and some fields in the header part may also change.

The external identification data relate to a source of the container, at least one destination of the container, and other relevant network information. The internal identification data may indicate, for each section, a position within the content part, a respective information type, and any content changes.

Container 700 is modeled after container 300 of FIG. 3. The data-container directory 320 includes fields 722, 724, 726, 728, 732, and 734. Container 700 is considered to belong to a data stream identified by a stream number (reference numeral 720). The network node supporting container conditioner 140 stores detailed source-destination information 340, in addition to other descriptors, for each data stream. In an independent container, detailed source-destination information would be included in the second part 340 of the container.

A message status field 722 may be used to determine if any content changes were made en route to destination. A message-size field 724 indicates a total current size of the container. A field 726 includes a current number, η, of sections. Each of fields 728(1), 728(2), ..., 728(η) indicates a current position within the content part of the data container at which a corresponding section starts. Each of fields 732(1), 732(2), ..., 732(η) indicates a current data type in a respective section, and each of fields 734(1), 734(2), ..., 734(η) indicates changes, if any, made to the content of a respective section.

The message status in field 722 may take any of a predefined number of values. For example, a value of 0 may indicate that the container's content is in its original form and no changes took place. A value other than 0 may indicate a respective number of changes. Likewise, a section status in a field 734(j) indicates a number of changes, if any, made in the content of section j, 1≦j≦η. Message status 722 and a section status 634(j), 1≦j≦η, may include an additional indication of severity of a modification.

Figure 8:
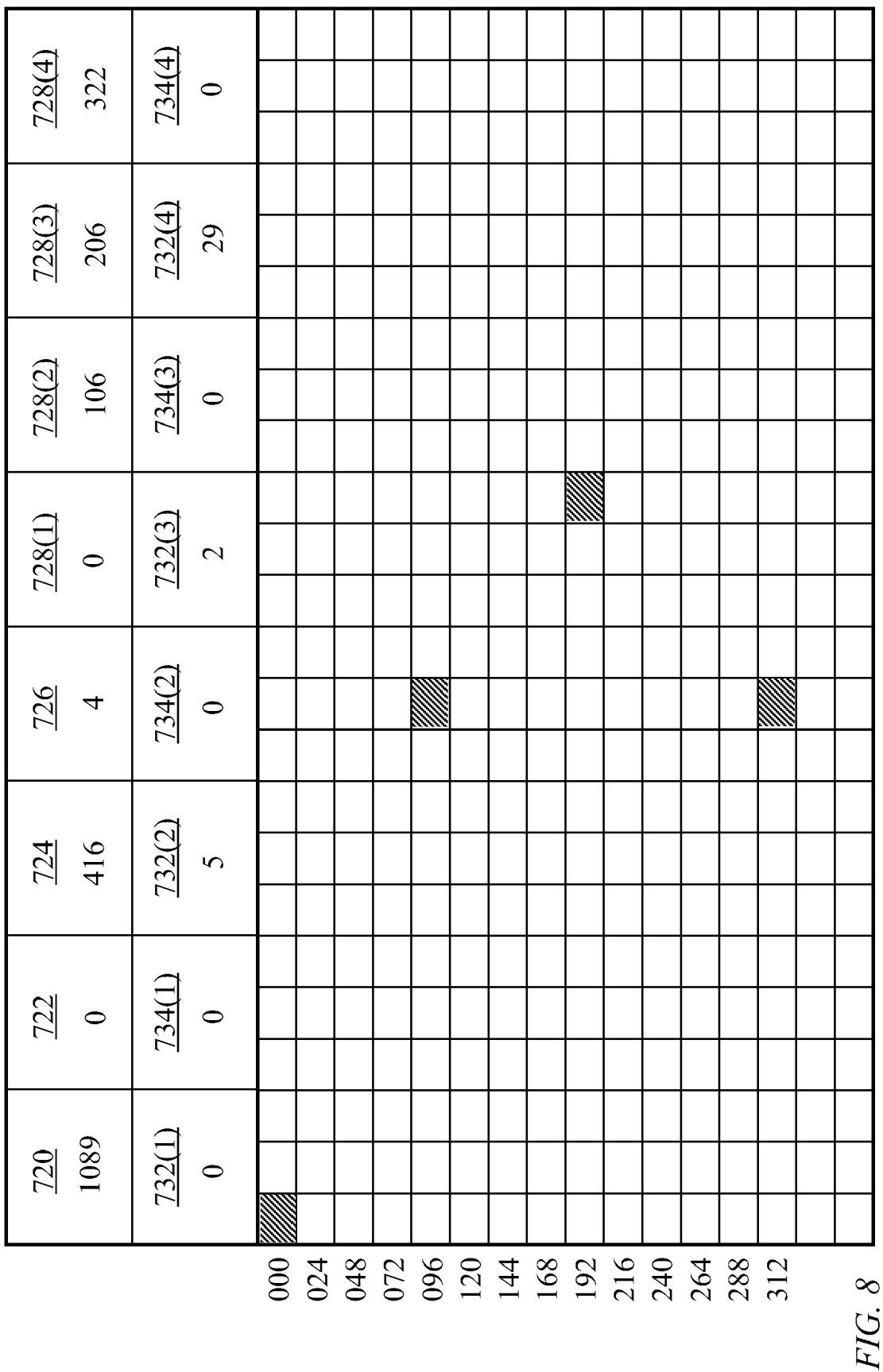
FIG. 8 illustrates an original data container having four content components.

FIG. 8 illustrates a specific data container 700 which belongs to a data stream identified by an index 1089 (reference numeral 720). The index "1089" would have been assigned in a connection setup process. Field 722 indicates that no changes took place in the entire container. The size of the container, including the header, is 416 bytes (field 724). A typical container may have a size of tens of kilobytes; a much smaller size is selected herein for ease of illustration. The content comprises 4 sections (field 726), and the sections start at indices 0, 106, 206, and 322 of the content part. The length of each field is predefined and, hence, the number η of sections decides the length of the header part. The value in field 732(j) indicates a type of data in section j, 1≦j≦η. The data types may be predefined and standardized. For example a value of "0" may indicate plain text, a value of "1" may indicate an encrypted text according to a first encryption key, a value of "2", may indicate an encrypted text according to a second encryption key, a value of 5 may indicate an encoded audio signal, a value of 29 may indicate a video signal encoded according to a specific compression algorithm, and so on. In the example of FIG. 8, the four section contain data of types 0, 5, 2, and 29 respectively, and the each field 734(j), 1≦j≦4, stores a value of "0", which is already known because field 722 contains a value of "0".

Figure 9:
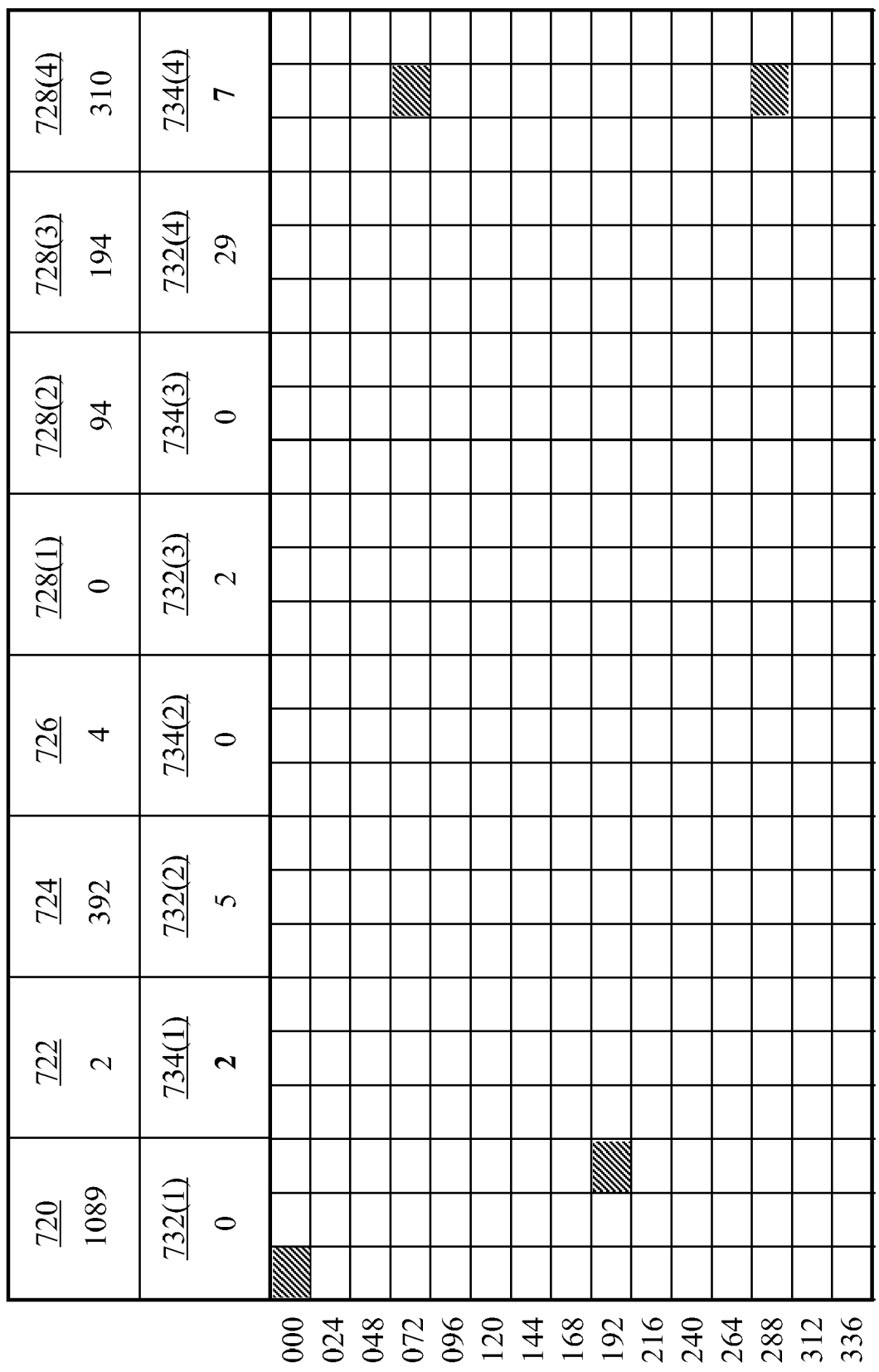
FIG. 9 illustrates a case where two content components of the original container of FIG. 8 are altered.

FIG. 9 illustrates a case where the content of container of FIG. 8 is altered. Field 722 has a value of 2, indicating that changes took place in two sections (the value in field 722 does not necessarily indicate a number of changes). The size of the container, including the header, has been reduced from 416 bytes to 392 bytes. Field 734(1) has a value of 2 indicating a respective type of change. The size of the first section decreased from 106 bytes to 94 bytes. Each of fields 734(2) and 734(3) has a value of "0", hence indicating that no changes took place in the second and third sections. However, the data of the second section now starts at index 94, instead of 106, within the content part and the data of the third section now start at index 194, instead of 206, within the content part due to the shortening of the first section. Field 734(4) has a value of 7, indicating a respective type of change in the encoded video signal, perhaps related to the compression method.

Figure 10:
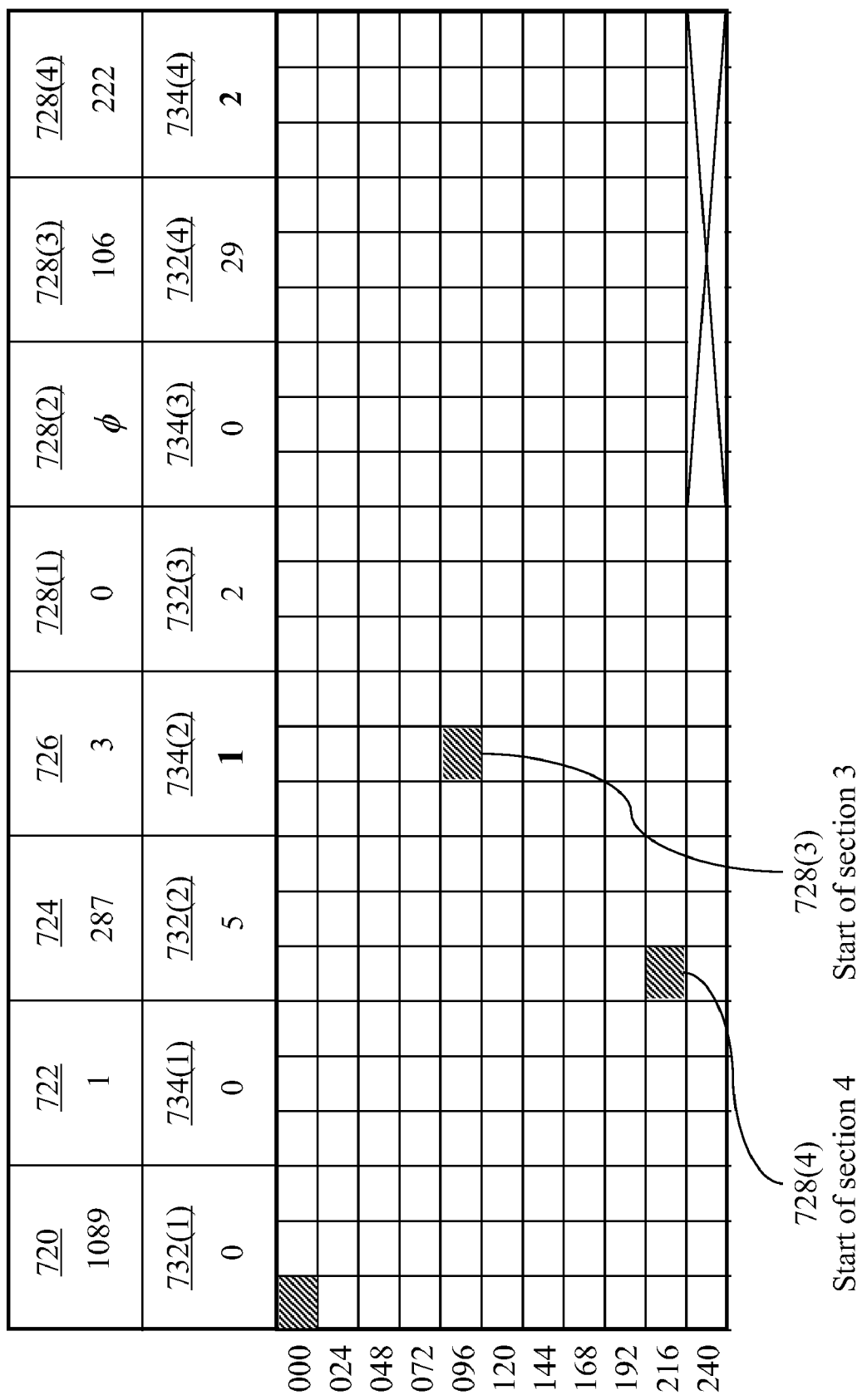
FIG. 10 illustrates a case where a content component of the original data container of FIG. 8 is deleted and another content component is shortened due to partial removal of data.

FIG. 10 illustrates a case where the second section of the content of container of FIG. 8 is deleted (field 728(2) indicates a NULL position φ) and the fourth content section is shortened due to partial removal of data. The indices of the third and fourth section are modified accordingly and the size of the container, including the header, is reduced from 416 units to 287 units.

Figure 11:
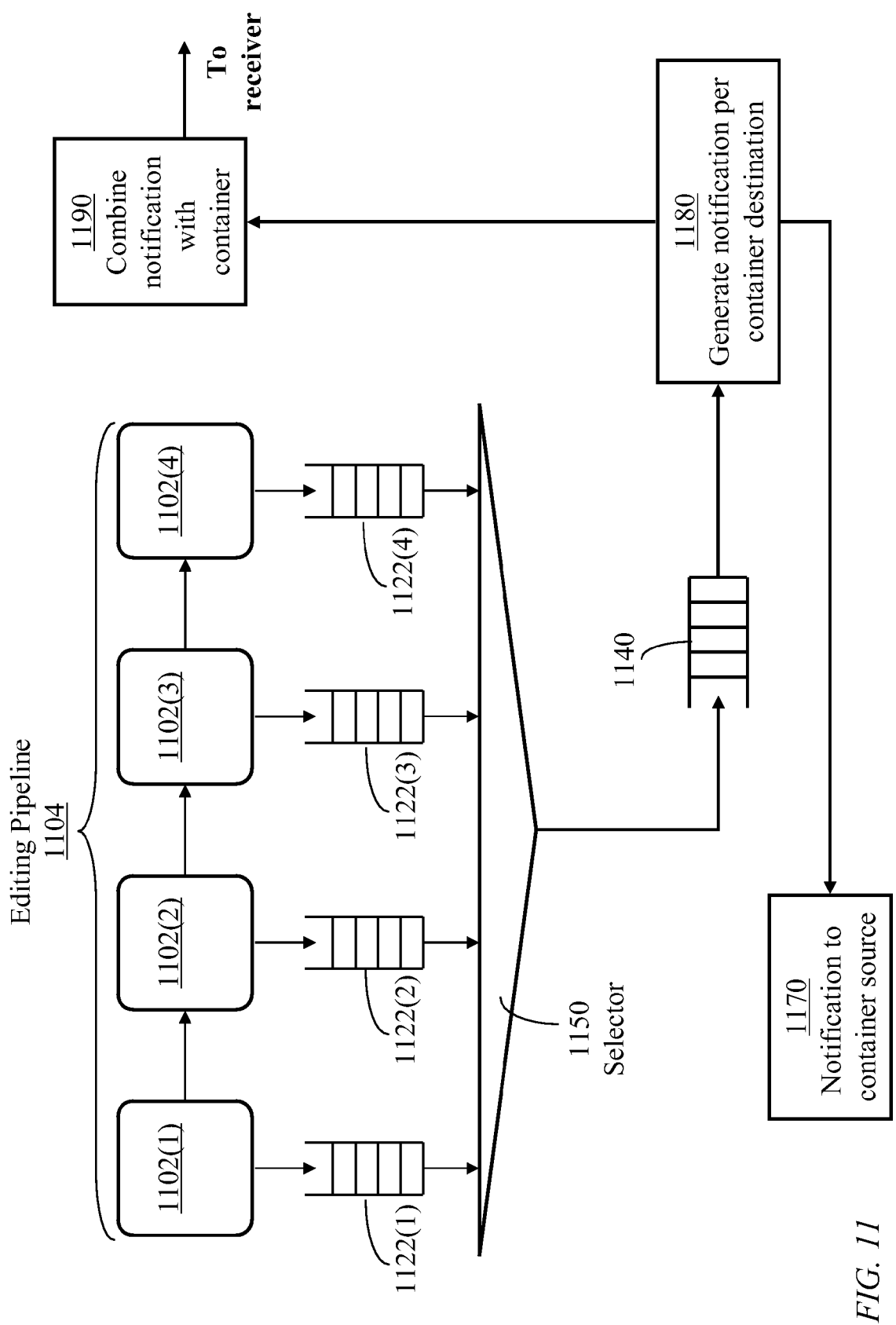
FIG. 11 illustrates a pipelined processing operation in accordance with an embodiment of the present invention.

FIG. 11 provides an overview of exemplary editing operations, where pipeline units 1102(1), 1102(2), 1102(3), and 1102(4), forming a pipeline 1104, perform tasks related to different aspects of container editing, and identify respective conditions, which may require content editing. Data relevant to identified conditions are held in buffers 1122(1), 1122(2), 1122(3), and 1122(4) to be transferred to a module 1180, through a selector 1150 and a buffer 1140. Module 1180 generates notifications based on the identified conditions and provides the notifications to a module 1190 which combines notifications with respective containers. A module 1170 optionally directs notifications to respective sources (respective transmitters 120). Modules 1170, 1180 and 1190 and the units 1102(1), 1102(2), 1102(3), and 1102(4), forming the pipeline 1104 can be implemented as a special purposes circuitry. Alternatively, they may comprise computer readable instructions installed on a computer readable medium and accessible by a computing device.

EXAMPLE

An example of content removal is provided next to explain how notifications may be inserted in a message.

Consider an input message, named input.mms, having the components:
(1) SMIL presentation
(2) compressed photographic image, named "image.jpg";
(3) encoded audio signal, named "audio.aac", generated according to the standardized "advanced audio coding" scheme; and
(4) audio-video recording, named "audio-video.3gp", encoded according to the "3GP format".

Two main processes need be implemented before transferring the input message to a respective receiving terminal. The first process modifies the message, if deemed necessary, to produced a respective output message. The second processes produces appropriate notifications where needed and associates the notifications with the modified message. Naturally, the output message would be identical to the input message if no modifications take place, unless it is desired to add an indication that the message has been examined and found to be free of undesirable insertions and compatible with the receiving terminal.

The first process of modifying the input message "input.mms" to produce a corresponding output message, designated as "output.mms", comprises:
(a) reading and parsing input.mms;
(b) identifying and setting-up any required adaptations for subsequent execution;
(c) executing all required adaptations;
(d) determining the expected size of output.mms—if the size exceeds a specified limit, 100 kilobytes for example, the component "audio.aac" may be sacrificed and the component "audio.aac" is associated with a state labeled "removed", and
(e) assembling the output message "output mms".

Having determined that component audio.aac is to be removed, the second process comprises:
(i) creating a "removal notification" using a respective template—the template has a variable that corresponds to the name of the component being removed;
(ii) setting the text entry to a string such as: "Removed media 'audio.aac' from the input message";
(iii) adding the text entry created in (ii) to the removal notification;
(iv) Adding the removal notification to output.mms; and
(v) if output.mms includes a presentation, adding a reference to the "removal notification" in the presentation.

Thus, the assembled output.mms contains:
(1) adapted image.jpg;
(2) adapted audio-video.3gp;
(3) entity that represents removal notification; and
(4) SMIL presentation The operation of the system for generating MMS notifications according to the embodiment of the invention is explained with the help of FIG. 12.

An editing pipeline 1204 executes a set of operations that perform required content-editing tasks. Pipeline units 1202 (1) to 1202(L), L>1, perform pipeline operations in sequence. During any operation, a problem that requires the generation of a notification may be identified. After all the pipeline operations are completed the system executes process 1212 which synthesizes and merges notifications.

Identifiers 1208(1), 1208(2), ..., of content conditions are generated and inserted in a buffer 1206. A condition identifier 1208 may contain multiple key-value pairs. The key-value parameters and a condition type characterize a condition. For example, an editing process may produce a virus notification with the key-value pairs of the form:

| { key:InputMediaName | value:media.jpg |
|---|---|
| key:VirusName | value:CommWarrior-B |
| key:VirusScanningEngine | value:Kaspersky}. |

The notification indicates which component ("media") is affected, the type of malicious software (malware) detected ("commonWorrier-B" in this example), and the software tool which detected the malware (product of Kaspersky).

These values (media.jpg, CommonWorrier-B, Kaspersky) are just exemplary. The key-value pairs are substituted in a respective template where variables are defined. Any of available data portions within a notification-message attachment may be used. A key in a key-value pair may indicate a content-component, a cause of content removal, a virus name, or a virus scanning engine. A value in a key-value pair may indicate a specific content-encoding method, an identifier of a specific virus, an identifier of a specific engine used to detect and remove a virus, or an indication of a message size and corresponding size limit.

After all the pipeline operations in pipeline units 1202 are completed, the container conditioner 140 formulates and amalgamates notifications (process 1212). The container conditioner 140 uses a template which may be available on a local repository or retrieved from a remote storage medium via a network 1214. Process 1212 provides a template identifier (name) 1213 and receives a file 1217 from template repository 1216. Multiple notifications may be combined. For example, notifications regarding the removal of multiple viruses may be amalgamated into one notification. Notification records produced in process 1212 are appended to respective messages in step 1220. An output message containing a number of components which include a SMIL presentation 1224, contents 1226(1), 1226(2), ..., and notification records 1228(1), 1228(2), etc., are held in a buffer 1222 for subsequent delivery to a respective receiver.

Notably, a template source repository 1216 comprises files stored on a computer memory and accessible by the computing device of the container conditioner 140 and the editing engine 240. To build a template name, in accordance with an embodiment of the present invention, a root name of the notification type (such as "content-adaptation" or "removal") may be concatenated with a language identifier (such as "English") and a character set (such as "US-ascii"), separated by underscore "_" symbols. The filename preferably has an extension ".txt". The language and the character set are provided by a controller of the editing engine and are based on system defaults. An example of a template name used for a removal notification is: "removal_english_us—ascii.txt".

The pipeline 1204 may be implemented as special purpose circuitry. Preferably, however, the pipeline 1204 is implemented as a computing device having stored thereon computer readable instructions which, when executed, cause the computing device to screen content of containers and, where necessary, adapt content of containers to be compatible with characteristics (such as decoding facilities) of respective receivers. The computer readable instructions also cause the computing device to mark containers according to results of screening and adaptation.

The buffer 1206 and the output container buffer 1222 are stored in a memory controlled by the computing device.

The processes 1212 and 1220 of building and merging notifications and appending the notifications to messages (containers) are implemented as computer readable instructions stored on a computer readable medium, e.g., random access memory, non-volatile memory, CD-ROM, DVD, etc.

Figure 13:
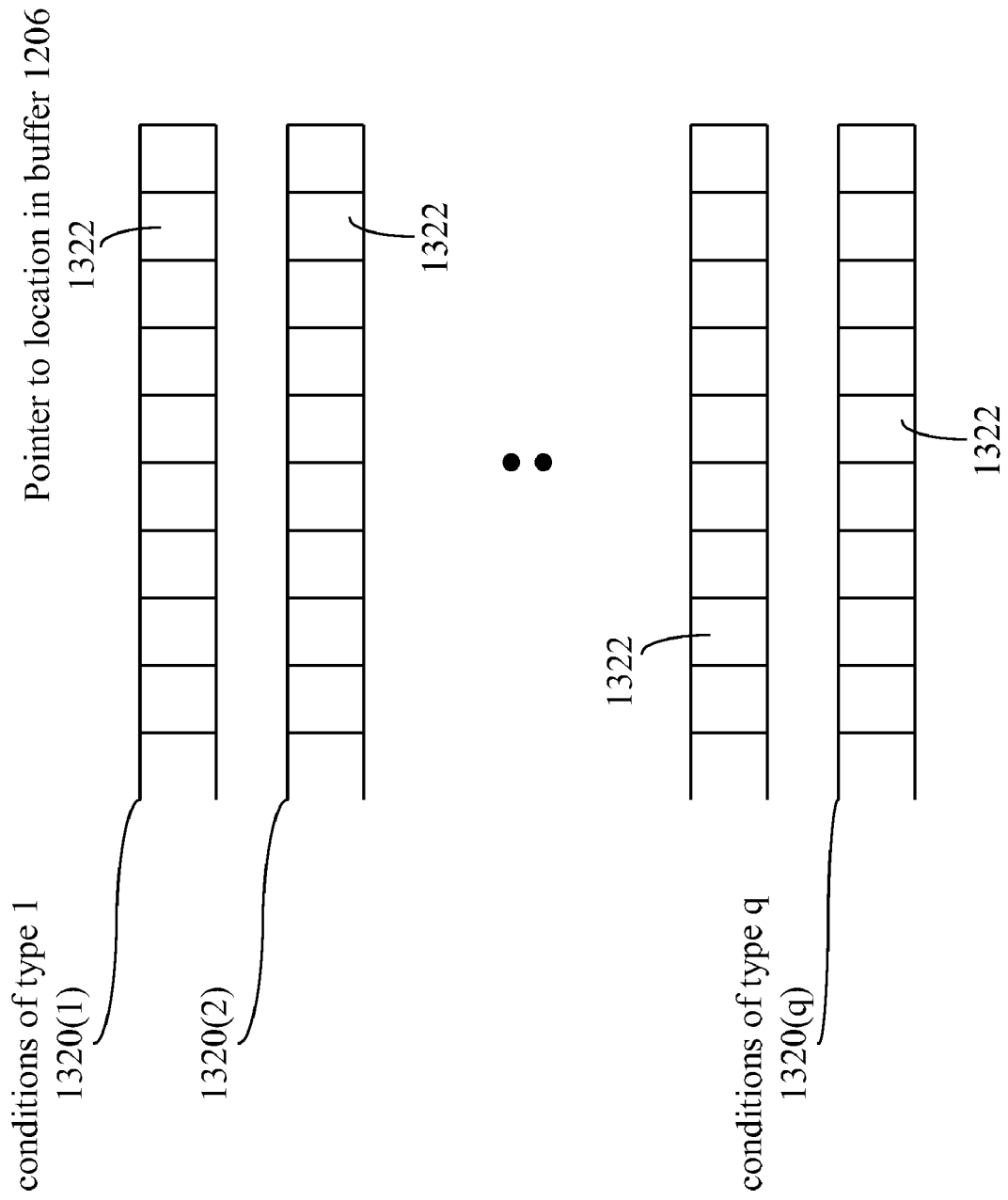
FIG. 13 illustrates aggregation of notifications related to common conditions, in accordance with an embodiment of the present invention.

FIG. 13 illustrates a number q, $q \geq 1$ of virtual queues 1320(1), ..., 1320(q) each of which corresponding to container conditions of a common type. A queue 1320(j), $1 \leq j \leq q$, contains pointers 1322 to locations of container-condition identifiers 1208 in buffer 1206. A single notification is produced for container conditions of the same condition type.

Figure 12:
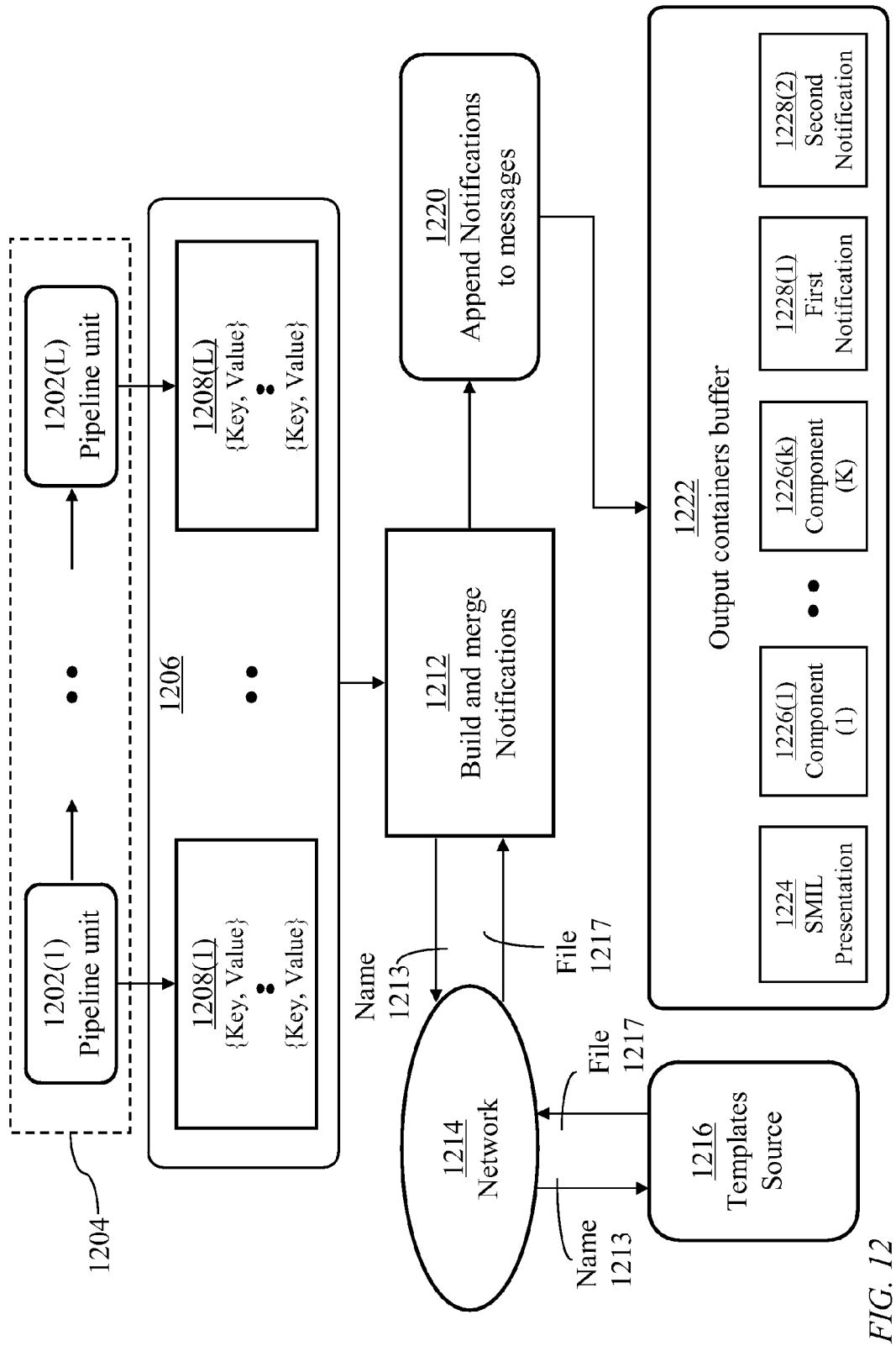
FIG. 12 illustrates the operation an editing engine generating notifications, in accordance with an embodiment of the present invention.
Figure 14:
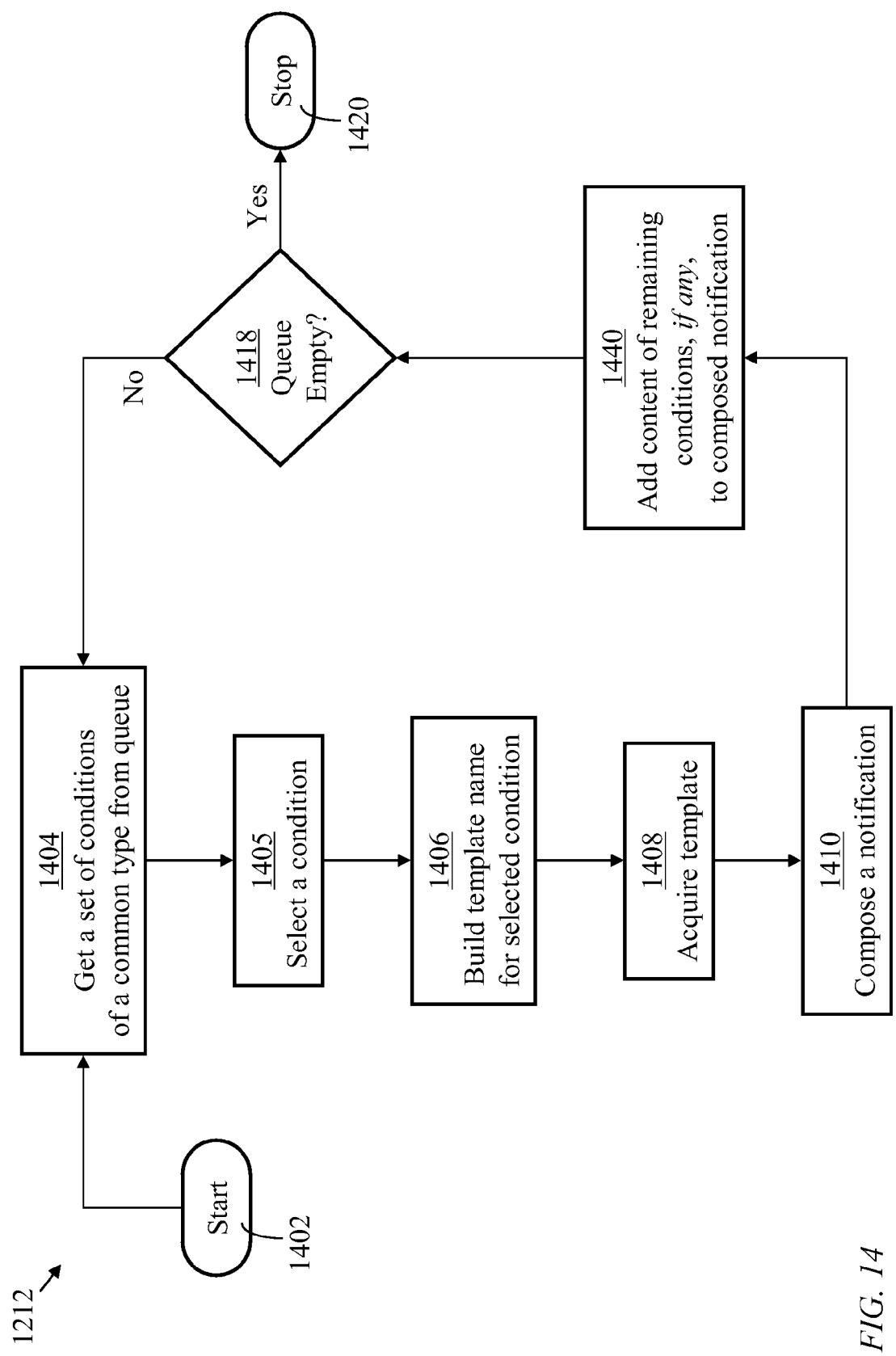
FIG. 14 illustrates a process of formulating and aggregating notifications in accordance with an embodiment of the present invention.

FIG. 14 details process 1212 of FIG. 12, which formulates and amalgamates notifications. The process starts in step 1402 in response to a request for transcoding. Conditions of the same condition type are considered together and reported in a single notification. Thus, step 1404 selects one of queues 1320 (FIG. 13) which holds pointers to condition identifiers 1208, in buffer 1206, corresponding to a set of conditions of a common condition type. In step 1405, one of the conditions in the set of conditions is selected. Step 1406 constructs a template name corresponding to the common condition type. Step 1408 uses the template name to acquire a respective template from template source 1216 which may be collocated with the editing engine 240 or accessible through a network. Step 1410 synthesizes and composes a notification corresponding to the common condition type. Step 1440 adds particulars of the remaining conditions in the set of conditions to the composed notification. The resulting notification is then ready to be communicated to a respective receiver 160.

If buffer 1206 still holds unprocessed condition identifiers 1208 (FIG. 12), i.e., if there is at least one virtual queue 1320 (FIG. 13) not yet considered, step 1404 is revisited to select a queue 1320 and steps 1405, 1406, 1408, 1410, and 1440 are executed. If step 1418 indicates that all identified conditions in buffer 1206 have been considered, process 1212 of FIG. 12 ends (step 1420) to be restarted in response to a new request for transcoding.

FIG. 15 illustrates modification of contents of a container destined to two receivers 160 of different characteristics. The container has six content components labeled component (1), component (2), ..., component (6). As described above, a content component may be encoded as a text, audio data, image, or video data of different formats. Component (1) is of type (1-A), both component (2) and component (3) are of type (2-A), both component (4) and component (5) are of type (3-A), and component (6) is of type (4-A). Types (1-A), (2-A), (3-A), and (4-A) may correspond to specific encoding techniques which may be standardized or proprietary. Receiver 1 is devised to decode components of type (1-C), (2-A), (3-A), and (4-E). Type (1-C) is a counterpart of type (1-A), for example, both relate to image display but with different resolutions. Likewise, type (4-E) is a counterpart of type (4-A). Receiver 2 is devised to decode components of type (1-A), (2-W), (3-B), and (4-A). Type (2-W) is a counterpart of type (2-A), and type (3-B) is a counterpart of type (3-A).

Before using module 640, FIG. 6, for transcoding component (1) and component (4) to produce a first output container suitable for receiver 1, and transcoding component (2), component (3), component (4), and component (5) to produce a second output container suitable for receiver 2, module 620, FIG. 6, performs content editing to detect any undesirable insertions. Component (2) and component (6) were found to contain a virus known as "Virus X" and component (5) was found to contain a virus known as "Virus Y". The editing engine 240 acquires a tool for removing Virus X, but is unable to find a tool for removing Virus Y. Thus, the editing engine 240 decides to delete component (5) in its entirety.

The first output container (FIG. 16) includes a translated component (1) from type (1-A) to type (1-C), filtered component (2) where Virus X is removed, original component (3) and component (4), and a translated component (6) from type (4-A) to type (4-E) with Virus X removed. Component (5) is deleted.

The second output container (FIG. 16) includes original component (1), a translated component (2) from type (2-A) to type (2-W) with Virus X removed, a translated component (3) from type (2-A) to type (2-W), a translated component (4) from type (3-A) to type (3-B), and filtered component (6) where Virus X is removed. Component (5) is deleted.

Multiple Container Conditioners

Figure 17:
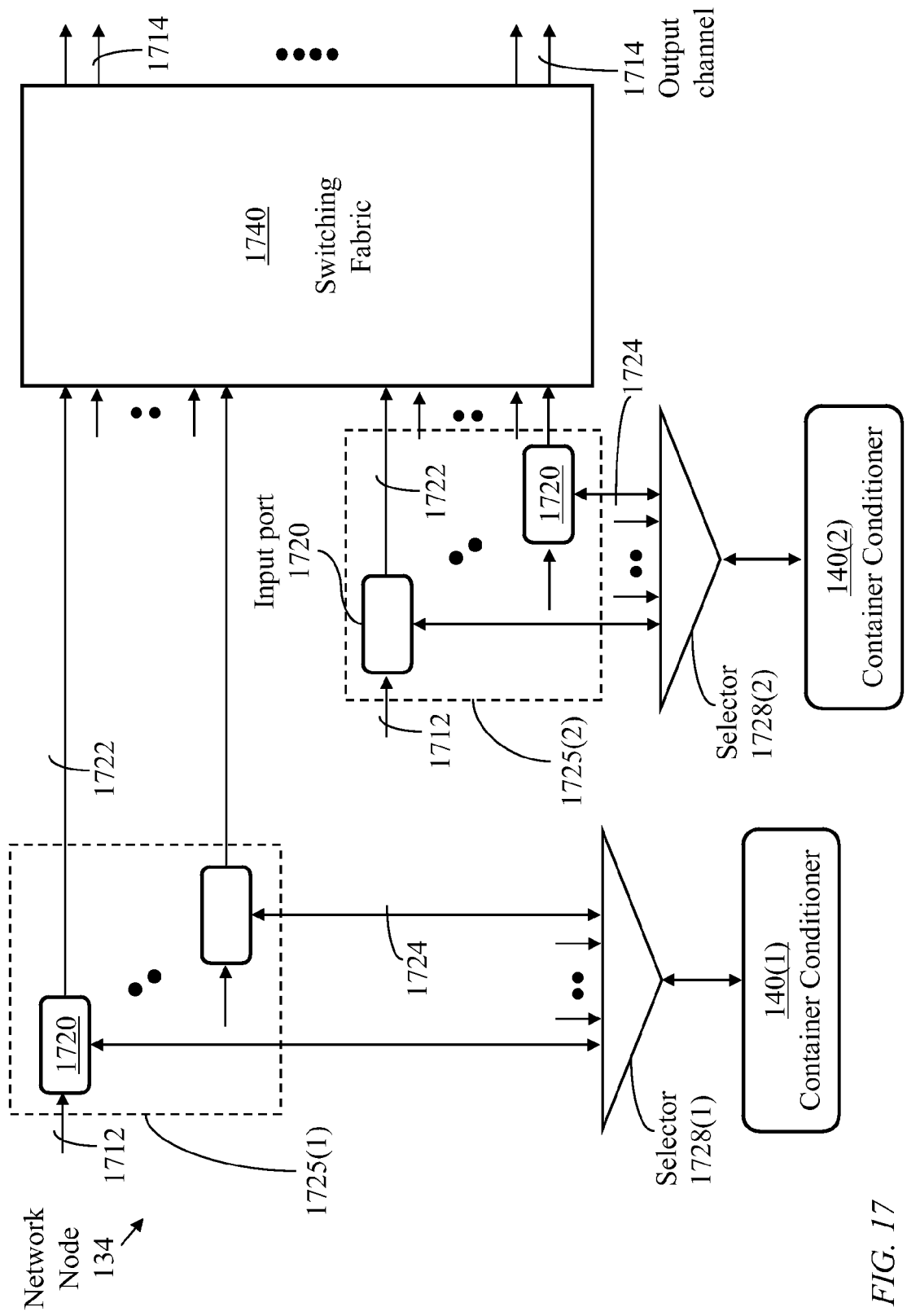
FIG. 17 illustrates a network node supporting more than one container conditioner associated with input ports of the node, in accordance with an embodiment of the present invention.
Figure 18:
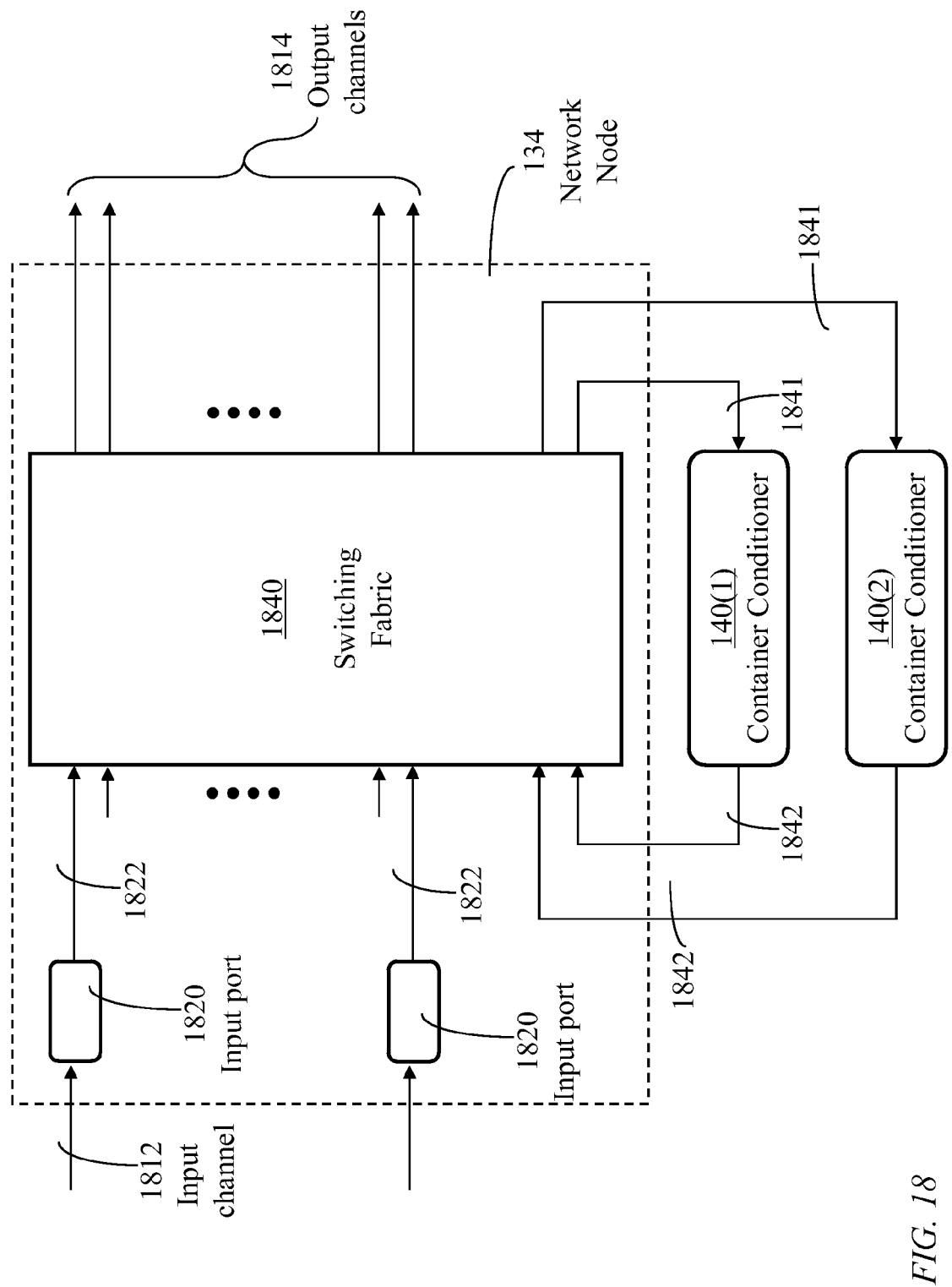
FIG. 18 illustrates a network node supporting more than one container conditioner accessed through the switching fabric of the node, in accordance with an embodiment of the present invention.

A set of container conditioners 140 may be associated with network elements in a variety of ways. Two exemplary arrangements where container conditioners are associated with a switching node are illustrated in FIG. 17 and FIG. 18. Notably, the arrangement of FIG. 17 is suitable for a case where container conditioners are collocated with a switching node while in the arrangement of FIG. 18 a container conditioner may be remotely located with respect to the switching node. Other arrangements for positioning container conditioners within a network may be devised.

FIG. 17 illustrates an arrangement where two container conditioners, individually identified as 140(1) and 140(2) are associated with network node 134 (FIG. 1), considered to comprise input ports 1720 and a switching fabric 1740. Each input port 1720 has a unidirectional channel 1722 to switching fabric 1740. Each input port 1720 of a first set 1725(1) of input ports has a dual channel to a selector 1728(1) connecting to container conditioner 140(1). Likewise, each input port 1720 of a second set 1725(2) of input ports has a dual channel 1724 to a second selector 1728(2) connecting to a second container conditioner 140(2). Selectors 1728(1) and 1728(2) may include buffers (not illustrated). Each of selectors 1724 (1) and 1724(2) time multiplexes incoming multimedia containers received from respective input ports 1720 and distributes processed containers back to the input ports. Data units received at input ports 1720 through input channels 1712 are switched through switching fabric 1740 to output channels 1714 leading to other network nodes. The received data units may include multimedia containers together with conventional forms of data traffic. Before switching a multimedia container through the switching fabric 1740, an input port 1720 directs the multimedia container to a respective container conditioner 140. The container conditioner examines the container and may modify its content to remove harmful insertions or to adapt content components to decoding facilities of a respective receiver. The container conditional augments the container by appending a notification and directs the augmented container to the input port for subsequent switching through the switching fabric 1740 to an output channel 1714 leading to a destination of the container. The number of input ports 1720 sharing a container conditioner 140 through a selector 1724 is determined by the flow rate (in bits per second) of multimedia-container traffic received at the network node 134 and the processing speed of the container conditioners 140.

FIG. 18 illustrates an arrangement where two container conditioners 140(1) and 140(2) are associated with network node 134, considered to comprise a switching fabric 1840 and input ports 1820 receiving data through input channels 1812. Each of container conditioner 140(1) and container conditioner 140(2) has a dual channel, comprising a channel 1841 from switching fabric 1840 a channel 1842, connecting to switching fabric 1840. Either of container conditioners 140 (1) and 140(2) may be collocated with network node 134 or remotely located.

Each input port 1820 has a unidirectional channel 1822 to switching fabric 1840. Conventional data traffic is switched through switching fabric to respective output channels 1814. However, a multimedia container received at input ports 1820 is first switched through switching fabric 1840 to one of the container conditioners 140(1) and 140(2) for processing as described above with reference to FIGS. 4-6. The processed containers, augmented with appropriate notifications, are switched to respective destinations through the switching fabric 1840. In general, an arbitrary number of container conditioners 140 may be associated with a network node depending on the number of input channels 1812, and the total flow rate (in bits per second) of multimedia traffic. A controller (not illustrated) of network node 134 distributes incoming multimedia containers equitably among the container conditioners 140.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for processing a message having multiple components in a multimedia messaging system, the method comprising:
   employing at least one processor for:
      examining said message to remove any present malicious software;
      identifying an intended receiver of said message;
      resolving any incompatibility of each component of said message with characteristics of said intended receiver;
      characterizing a condition of said message by at least one key-value pair and a condition type according to a result of said examining and a result of said resolving;
      formulating an identifier of a notification template according to said condition type;
      retrieving said notification template from a repository of notification templates using said identifier;
      composing a notification using said notification template and said at least one key-value pair;
      inserting said notification in said message to produce an augmented message;
      sending said augmented message to said intended receiver; and
      sending said notification to an originator of said message.

2. The method of claim 1 wherein said examining comprises detecting presence of malicious software in an attachment of said message.

3. The method of claim 1 wherein said resolving comprises steps of:
   determining capabilities of said intended receiver; and
   translating a content component of said message from a current format to a different format compatible with said capabilities.

4. The method of claim 1 wherein a key in said at least one key-value pair indicates one of:
- a content-component name;
- a cause of content removal;
- a virus name; and
- a virus scanning engine;

and wherein a value in said at least one key-value pair indicates one of:
- a specific content-encoding method;
- an identifier of a specific virus;
- an identifier of a specific engine used to detect and remove a virus; and
- an indication of a message size and corresponding size limit.

5. The method of claim 1 further comprising merging said notification with other notifications corresponding to said condition type.

6. The method of claim 5 further comprising sending said notification to an originator of said message.

7. The method of claim 1 further comprising sending said at least one key-value pair and said condition type to a server associated with said multimedia messaging system for statistical analyses.

8. A method of processing a multimedia data container comprising multiple components, the method comprising:
employing at least one processor for:
- receiving said container;
- parsing said container to determine:
  - an identifier of a transmitter and identifiers of addressed receivers of said container; and
  - properties of each component in said multiple components;
- screening said each component to:
  - eliminate harmful insertions; and
  - mark said each component accordingly;
- acquiring characteristics of a selected receiver of said addressed receivers;
- determining a current size of said container:
- determining a size upper bound, and where said current size exceeds said size upper bound, delete one of said content components according to a preset priority order:
- ascertaining compatibility of said properties with said selected receiver;
- where said properties are incompatible with said selected receiver, adapting said each component to suit said selected receiver;
- characterizing a condition of said container by at least one key-value pair:
- composing a notification specific to said each receiver based on said at least one key-value pair:
- adding said notification to said container to produce an augmented container: and
- sending said augmented container to said selected receiver.

9. The method of claim 8 further comprising
sending said notification from said container conditioner to said transmitter to identify said adapting of said each component for said selected receiver.

10. The method of claim 8 wherein said notification comprises at least one of:
- a text;
- an image;
- an encoded audio signal; and
- an encoded video signal.

11. The method of claim 8 further comprising:
selecting at least one component from among said multiple components to be a candidate for compression to reduce a size of said at least one component.

12. The method of claim 8 further comprising:
- determining state of a network path from said container conditioner to said selected receiver; and
- determining said size upper bound of said augmented container according to:
  - said state of said network path; and
  - characteristics of said selected receiver.

13. A non-transitory computer-readable storage medium having computer readable instructions stored thereon for execution by a processor to perform the steps of the method of claim 8.

14. An editing engine for conditioning multimedia containers, the editing engine comprising:
a computing device and a memory device storing computer readable instructions which cause the computing device to:
- receive a container;
- parse said container into content components;
- determine encoding formats of said content components and for a particular encoding format determine one of:
  - accepting said particular encoding format;
  - translating a content component encoded in said particular encoding format to a new encoding format for which said first receiver has a corresponding decoding facility; and
  - deleting a content component encoded in said particular encoding format;
- examine each content component to detect presence of malicious insertions and perform corrections of said content components where malicious insertions are found;
- identify a first receiver of said container;
- acquire characterization of decoding facilities of said first receiver;
- determine compatibility of said encoding formats with said decoding facilities;
- formulate appropriate condition codes of said container according to said corrections and said compatibility;
- synthesize a first notification according to said appropriate condition codes;
- determine a current size of said container including said first notification;
- determine a size upper bound dictated by said first receiver;
- where said current size exceeds said size upper bound, delete one of said content components according to a preset priority order;
- where said current size does not exceed said size upper bound:
  - insert said first notification in said container to produce a first augmented container;
  - send said first augmented container to said first receiver; and
  - send said first notification to an originator of said container.

15. The editing engine of claim 14 wherein said computer readable instructions cause said computing device to acquire said characterization of decoding facilities by causing said computer device to access a receiver database, said receiver database storing information on decoding facilities of each receiver type from among a plurality of receiver types.

16. The editing engine of claim 14 wherein said computer readable instructions further cause said computing device to:
identify a second receiver of said container;
acquire characterization of decoding facilities of said second receiver;
determine conformity of said encoding formats to said decoding facilities of said second receiver;
formulate specific condition codes of said container according to said corrections and said conformity; and
synthesize a second notification according to said specific condition codes.

17. The editing engine of claim 14 wherein said computer readable instructions further cause said computing device to send said first notification to a service-analysis facility for service planning purposes.

18. An editing engine for conditioning multimedia containers, the editing engine comprising:
computer readable instructions stored on a non-transitory computer-readable storage medium, which when executed by a computing device, cause the computing device to:
receive a container;
parse said container into content components;
determine encoding formats of said content components;
examine each content component to detect presence of malicious insertions and perform corrections of said content components where malicious insertions are found;
identify a first receiver of said container;
acquire characterization of decoding facilities of said first receiver;
determine compatibility of said encoding formats with said decoding facilities;
formulate appropriate condition codes of said container according to said corrections and said compatibility; and
synthesize a first notification according to said appropriate condition codes by accessing a versatile dictionary storing:
a comprehensible description, in multiple display formats, of each of a plurality of condition codes; and
notification patterns encoded for different forms of display.

19. The editing engine of claim 18 wherein said computer readable instructions cause said computing device to:
determine display formats provided by said versatile dictionary;
select at least one display format compatible with said decoding facilities of said first receiver; and
instruct a controller of said versatile dictionary to provide descriptions of said appropriate condition codes in said at least one display format.

20. A system for conditioning data containers for delivery to receivers, the system comprising:
a container conditioner having a dual link to a node in a telecommunication network, the container conditioner comprising a processor and a memory device storing processor-executable instructions forming an editing engine organized into:
a communication module for receiving incoming data containers from said node and transmitting outgoing data containers to said node;
a screening module for inspecting said incoming data containers to detect and remove undesirable insertions and indicate respective container-content conditions;
an adaptation module for:
determining conformity of content components of said data containers to decoding facilities of respective intended receivers of said data containers;
formulating conformity conditions of each content component; and
modifying non-conforming content components to produce conditioned data containers;
a notification module for:
formulating notifications according to said container-content conditions and said conformity conditions; and
adding said notifications to respective conditioned data containers to produce augmented data containers;
wherein said communication module is configured to:
direct said augmented data containers to said node to be switched to respective receivers through said telecommunication network; and
direct said notifications to said node to be switched to respective transmitters.

21. The system of claim 20 further comprising:
a server computer communicatively coupled to said container conditioner, said server computer having a receiver database stored in a non-transitory computer readable storage medium, said receiver database storing information pertinent to decoding facilities of a plurality of receiver types; and
a computing device communicatively coupled to said container conditioner, said computing device being configured to access a versatile dictionary comprising data stored in a memory device, the versatile dictionary providing encoded comprehensible displays corresponding to a predefined set of container-content conditions and conformity conditions.

22. The system of claim 21 wherein said comprehensible displays comprise:
a text;
an image;
an encoded audio signal; and
an encoded video signal.

* * * * *

UNITED STATES PATENT AND TRADEMARK OFFICE
CERTIFICATE OF CORRECTION

| | | |
|---|---|---|
| PATENT NO. | : 8,220,051 B2 | Page 1 of 1 |
| APPLICATION NO. | : 12/238390 | |
| DATED | : July 10, 2012 | |
| INVENTOR(S) | : Richard Elliott Norton et al. | |

It is certified that error appears in the above-identified patent and that said Letters Patent is hereby corrected as shown below:

Column 19, line 40, ":" should read --;--.

Column 19, line 44, ":" should read --;--.

Column 19, line 51, ":" should read --;--.

Column 19, line 53, ":" should read --;--.

Column 19, line 55, ":" should read --;--.

Column 20, line 26, "determine" should read --perform--.

Signed and Sealed this
Fourteenth Day of August, 2012

David J. Kappos
*Director of the United States Patent and Trademark Office*